United States Patent
Sears et al.

(10) Patent No.: US 9,008,913 B1
(45) Date of Patent: Apr. 14, 2015

(54) STEERING CONTROL SYSTEM FOR A TOWED AXLE

(71) Applicant: Oshkosh Corporation, Oshkosh, WI (US)

(72) Inventors: Mitch F. Sears, Ripon, WI (US); Kevin W. Magners, Appleton, WI (US); Jeffrey J. Miller, Oshkosh, WI (US); Benjamin G. Lochner, Neenah, WI (US); Jason M. Ollanketo, Oshkosh, WI (US); Jason R. Shively, Oshkosh, WI (US); Sean Strosahl, Oshkosh, WI (US); Kellie Watters, Oshkosh, WI (US); Bashar M. Amin, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 14/088,177

(22) Filed: Nov. 22, 2013

(51) Int. Cl.
G06F 19/00 (2011.01)
B62D 13/00 (2006.01)

(52) U.S. Cl.
CPC ..................... B62D 13/00 (2013.01)

(58) Field of Classification Search
CPC ......... E01H 5/067; E01H 5/068; B62B 13/00; B62B 13/04; B62D 55/04
USPC ................... 701/41; 172/45, 244, 264, 684.5; 280/24
See application file for complete search history.

(56) References Cited

U.S. PATENT DOCUMENTS

| | | | | |
|---|---|---|---|---|
| 3,779,319 A * | 12/1973 | Pease | .............................. | 172/45 |
| 5,001,639 A | 3/1991 | Breen | | |
| 5,169,112 A * | 12/1992 | Boyles et al. | .................. | 248/550 |
| 5,343,960 A * | 9/1994 | Gilbert | ........................... | 172/823 |
| 5,411,450 A | 5/1995 | Gratton et al. | | |
| 5,417,299 A | 5/1995 | Pillar et al. | | |
| 5,558,350 A | 9/1996 | Kimbrough et al. | | |
| 5,607,028 A | 3/1997 | Braun et al. | | |
| 5,638,281 A * | 6/1997 | Wang | ............................ | 701/301 |
| 6,086,074 A | 7/2000 | Braun | | |
| 6,668,225 B2 | 12/2003 | Oh et al. | | |
| 6,854,557 B1 | 2/2005 | Deng et al. | | |
| 6,882,917 B2 | 4/2005 | Pillar et al. | | |
| 6,883,815 B2 | 4/2005 | Archer | | |
| 6,909,944 B2 | 6/2005 | Pillar et al. | | |
| 7,073,620 B2 | 7/2006 | Braun et al. | | |
| 7,258,194 B2 | 8/2007 | Braun et al. | | |
| 7,367,407 B2 * | 5/2008 | Lannert | ...................... | 172/684.5 |

(Continued)

FOREIGN PATENT DOCUMENTS

EP        2 072 375        6/2009

OTHER PUBLICATIONS

Halagamuge et al., A Hierarchical Hybrid Fuzzy Controller for Realtime Reverse Driving Support of Vehicles with Long Trailers, IEEE, p. 1994.*

*Primary Examiner* — McDieunel Marc
(74) *Attorney, Agent, or Firm* — Foley & Lardner LLP

(57) ABSTRACT

A trailer includes a chassis having a hitch, an axle having a pair of tractive elements rotatably coupled to the chassis, an actuator coupled to the chassis and positioned to steer the pair of tractive elements, and a processing circuit. The processing circuit has an input for receiving a transmission gear of a tractor vehicle and a variable output for engaging the actuator. The processing circuit is configured to control the steering of the pair of tractive elements according to a control strategy that varies based on the transmission gear of the tractor vehicle.

20 Claims, 25 Drawing Sheets

(56) References Cited

U.S. PATENT DOCUMENTS

| | | |
|---|---|---|
| 7,392,122 B2 | 6/2008 | Pillar et al. |
| D572,642 S | 7/2008 | Steckling et al. |
| 7,451,028 B2 | 11/2008 | Pillar et al. |
| 7,580,783 B2 | 8/2009 | Dix |
| 7,756,621 B2 | 7/2010 | Pillar et al. |
| 7,793,965 B2 | 9/2010 | Padula |
| 8,333,390 B2 | 12/2012 | Linsmeier et al. |
| 2001/0050940 A1* | 12/2001 | Ooyama et al. ................. 372/61 |
| 2005/0113996 A1 | 5/2005 | Pillar et al. |
| 2006/0143952 A1* | 7/2006 | Lannert ........................... 37/268 |
| 2008/0231701 A1 | 9/2008 | Greenwood et al. |
| 2009/0229149 A1* | 9/2009 | Tesinsky ......................... 37/196 |
| 2012/0232760 A1 | 9/2012 | Hubalek |
| 2012/0283909 A1 | 11/2012 | Dix |

\* cited by examiner

STEERING CONTROL SYSTEM FOR A TOWED AXLE

BACKGROUND

The present application relates to sweeper vehicles. In particular, the present application relates to the operation of a snow removal apparatus including a tow-behind snow removal broom. A snow removal vehicle may include a tractor and a trailer. The tractor may include a snow plow, blower, sweeper, or other apparatus for removing snow. In some instances, the snow plow, blower, or other apparatus may leave trace amounts of snow behind. Such residual snow may be removed with a tow-behind broom mounted on a trailer. It should be understood that the tractor tows the trailer including the tow-behind broom to facilitate sweeping the snow and other material.

Various challenges arise for operators driving the snow removal apparatus. For example, the trailer may not track the path plowed or blown by the snow-removal apparatus on the tractor. Such a lack of overlap may leave some areas unswept or may result in damage to the broom (e.g., due to contact between bristles of the broom and unplowed or unblown snow). While some trailers include axles that are steered to facilitate tracking, such trailers can be difficult to control in the reverse direction and produce an unfamiliar experience for the operator.

SUMMARY

One embodiment of the invention relates to a trailer. The trailer includes a chassis having a hitch, an axle having a pair of tractive elements rotatably coupled to the chassis, an actuator coupled to the chassis and positioned to steer the pair of tractive elements, and a processing circuit. The processing circuit has an input for receiving a transmission gear of a tractor vehicle and a variable output for engaging the actuator. The processing circuit is configured to control the steering of the pair of tractive elements according to a control strategy that varies based on the transmission gear of the tractor vehicle.

Another embodiment of the invention relates to a vehicle. The vehicle includes a tractor vehicle having a transmission configured to provide a transmission state relating to at least one of a selected transmission gear and an obtained transmission gear, a trailer, and a processing circuit. The trailer includes a chassis, an axle having a pair of tractive elements rotatably coupled to the chassis, and an actuator coupled to the chassis and positioned to steer the pair of tractive elements. The processing circuit has an input for receiving the transmission state and a variable output for engaging the actuator. The processing circuit is configured to control the steering of the pair of tractive elements according to a control strategy that varies based on the transmission state.

Yet another embodiment of the invention relates to a steering control method for a trailer including a chassis, an axle having a pair of tractive elements rotatably coupled to the chassis, and an actuator coupled to the chassis and positioned to steer the pair of tractive elements. The method includes identifying a transmission gear of a tractor vehicle with a processing circuit, controllably steering the pair of tractive elements such that the trailer follows the tractor vehicle when the transmission gear is a forward gear, and centering the pair of tractive elements to facilitate maneuvering the trailer when the transmission gear is a reverse gear.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
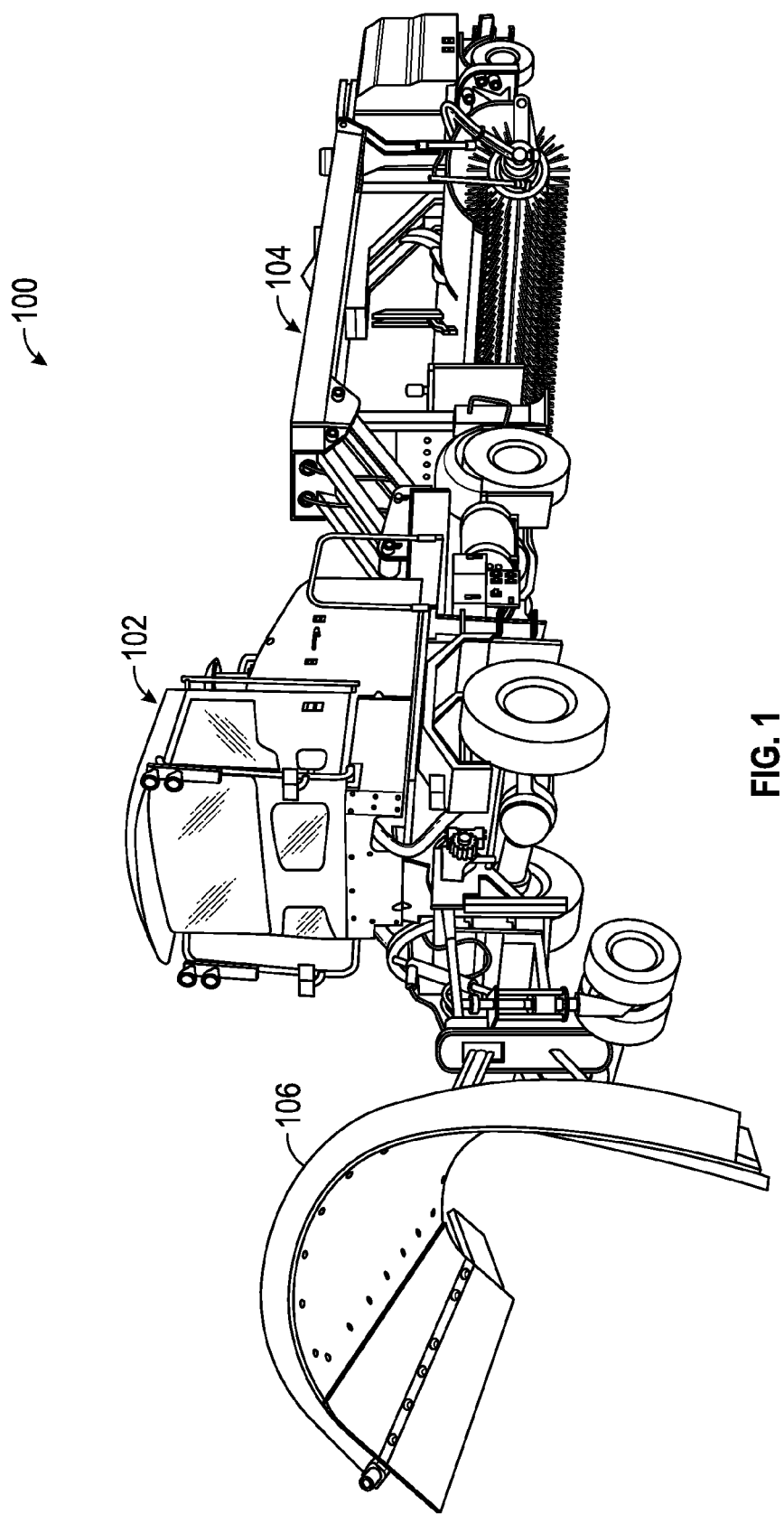
FIGS. 1-2 are perspective views of a snow removal vehicle including a tractor vehicle and a trailer, according to an exemplary embodiment.
Figure 2:
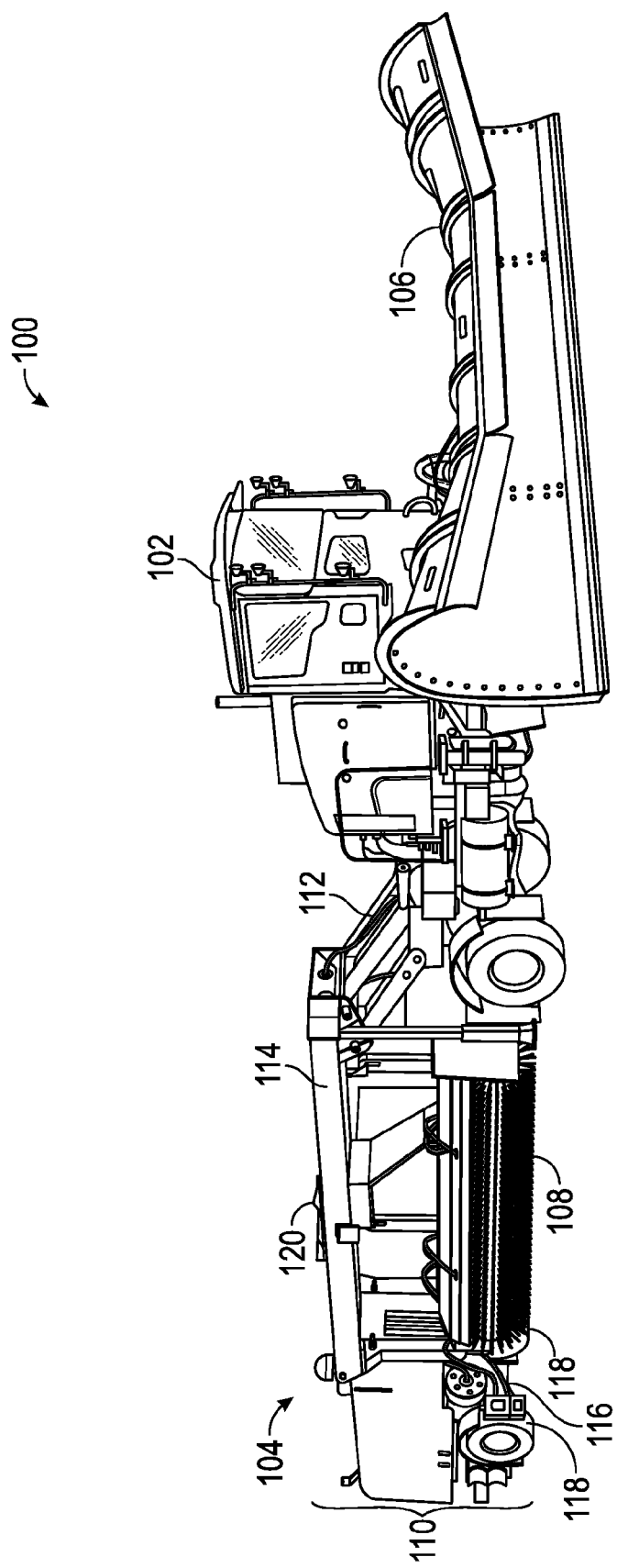
Figure 3:
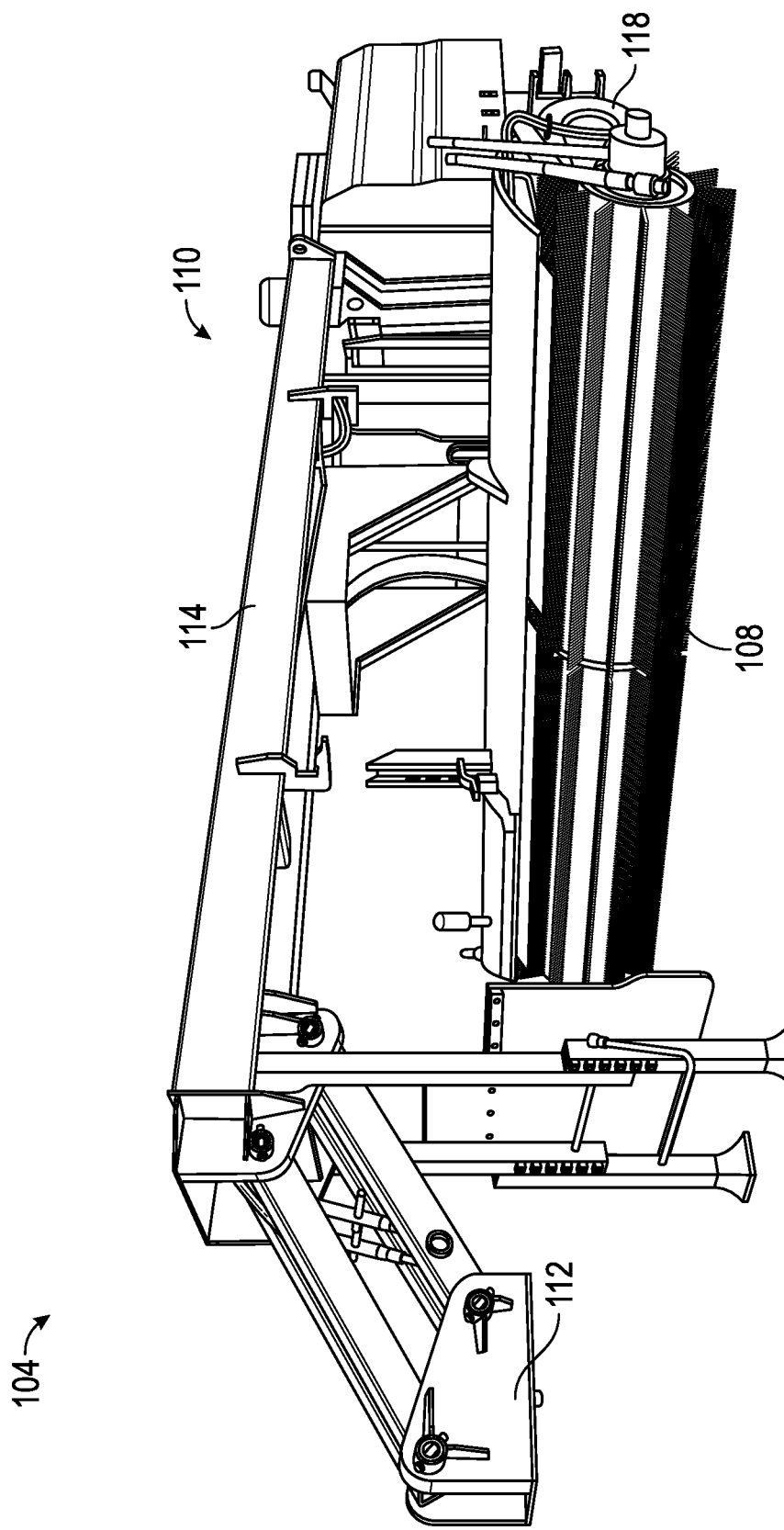
FIG. 3 is a perspective view of a trailer for the snow removal vehicle including a broom assembly, according to an exemplary embodiment.
Figure 4:
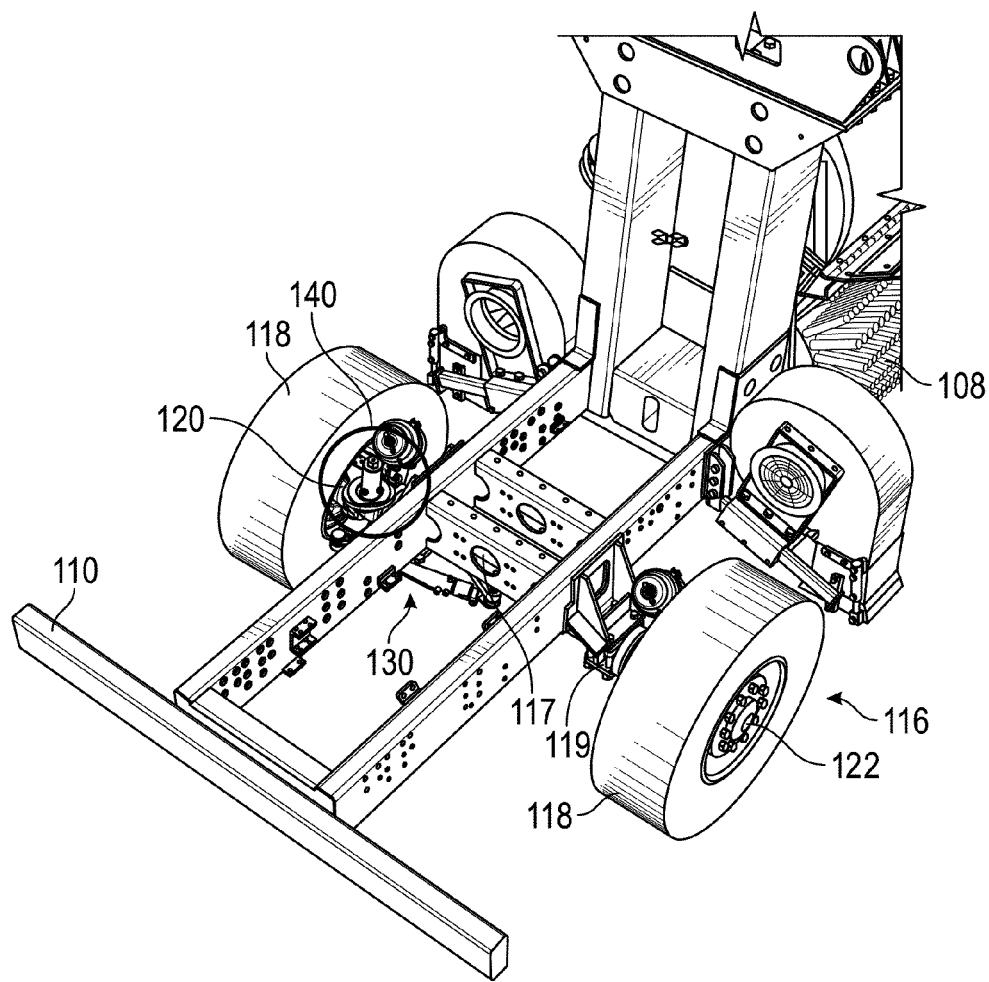
FIGS. 4-8 are partial perspective views of a trailer for a snow removal vehicle having a steering assembly and a locking mechanism, according to an exemplary embodiment.

According to the exemplary embodiment shown in FIGS. 1-3, a vehicle, shown as snow removal vehicle 100, includes a tractor 102 and a trailer 104. In one embodiment, tractor 102 includes a vehicle specifically designed to haul trailer 104. In other embodiments, tractor 102 includes another type of vehicle (e.g., a pickup truck, a military vehicle, etc.) that includes a hitch. By way of example, the vehicle may be equipped with a fifth wheel hitch connection, a standard tow hitch including a receiver and a tow ball, or still another coupling. A plurality of tractive elements facilitate movement (e.g., driving, turning, etc.) of tractor 102. In one embodiment, a first set of the tractive elements are used to steer tractor 102, and a second set of tractive elements are coupled to a vehicle drive train (e.g., including an engine, transmission, etc.) and drive tractor 102. In other embodiments, each of the tractive elements drive tractor 102 (e.g., tractor 102 may be all-wheel drive), with a subset of the tractive elements (e.g., the front wheels) both steering and driving tractor 102. In still other embodiments, each of the tractive elements both drive and steer tractor 102.

As shown in FIGS. 1-2, a snow removal device, shown as plow 106, is coupled to a front portion of tractor 102. In other embodiments, the snow removal device includes a blower assembly, a broom, or still another device. Plow 106 is configured to plow snow in the path of snow removal vehicle 100, according to one embodiment. In other embodiments, the snow removal device otherwise interacts with the snow (e.g., blows, sweeps, etc.). According to still other embodiments, tractor 102 does not include a snow removal device.

As shown in FIG. 2, trailer 104 includes a broom assembly. The broom assembly may be configured to interface with a material (e.g., snow, debris, etc.) positioned on a surface (e.g., an airport runway, a roadway, a sidewalk, etc.). As shown in FIG. 2, the broom assembly includes a broom, shown as broom 108. Broom 108 may include a plurality of elements (e.g., bristles, flaps, etc.) that are rotated to clear material from the surface. In one embodiment, the broom assembly includes a broom controller configured to vary a feature of broom 108 (e.g., a position relative to a ground surface, a position relative to a portion of trailer 104, a rotation speed, etc.). The broom controller may be coupled to various input/output devices (e.g., sensors, a hydraulic system, a user interface, etc.). Such input/output devices may couple the broom controller to various subsystems of snow removal vehicle 100. While this discussion emphasizes using the vehicle to remove snow, it should be understood that systems and methods disclosed herein may be applied to a vehicle for removing other types of material (e.g., debris). In still other embodiments, tractor 102 and trailer 104 are used to perform still other functions (e.g., transport goods, etc.).

As shown in FIG. 2, trailer 104 includes a frame 110 having a hitch portion, shown as hitch 112, and a chassis, shown as chassis 114. According to an exemplary embodiment, hitch 112 couples trailer 104 with tractor 102. It should be understood that trailer 104 may rotate relative to tractor 102 about hitch 112 (e.g., as tractor 102 turns). As shown in FIG. 2, trailer 104 includes an axle assembly 116 that includes a pair of tractive elements, shown as wheels 118. According to an exemplary embodiment, wheels 118 rotate relative to chassis 114 and are turned (i.e. steered) according to a steering control strategy. Turning wheels 118 steers trailer 104, thereby reducing the risk of leaving some areas unswept or damaging broom 108 (e.g., due to contact between bristles of the broom and unplowed or unblown snow). According to an exemplary embodiment, broom 108 is movably coupled to frame 110 with a rotating element (e.g., a slewing ring, etc.).

As shown in FIGS. 1-3, trailer 104 includes a single axle assembly 116 having a single pair of wheels 118 coupled to a rear portion of chassis 114. According to an alternative embodiment, trailer 104 includes a plurality of axles (e.g., two, three, etc.) each having at least one tractive element (e.g., each having a pair of wheels, each having two pairs of wheels, etc.). According to still another alternative embodiment, trailer 104 includes an axle otherwise positioned along chassis 114 (e.g., at the front of chassis 114, in a middle portion of chassis 114, etc.).

Referring next to FIGS. 4-8, wheels 118 are movably coupled to frame 110. By way of example, wheels 118 may rotate about an axis as trailer 104 moves (e.g., an axis perpendicular to a direction of travel and a vertical axis, an axis perpendicular to a pair of longitudinal frame members of frame 110 and a vertical axis, etc.). By way of another example, wheels 118 may be turned about still another axis (e.g., a kingpin axis, etc.). As shown in FIGS. 4-8, axle assembly 116 includes a pair of hubs, shown as hub 120 and hub 122, that couple wheels 118 to a frame member, shown as frame member 117. Hub 120 and hub 122 each include a movable portion that rotates and turns with wheels 118 and a fixed portion that is coupled to frame member 117, according to an exemplary embodiment. Frame member 117 may be tubular, may include a solid portion, or may be still otherwise shaped. According to the exemplary embodiment shown in FIGS. 4-8, frame member 117 is coupled to frame 110 of the trailer with a pair of brackets, shown as brackets 119. In other embodiments, frame member 117 may be otherwise coupled to frame 110 (e.g., welded to frame 110, directly bolted to frame 110, etc.). In still other embodiments, axle assembly 116 includes wheels 118 that are otherwise coupled to frame 110 (e.g., directly mounted to a frame rail or side plate, coupled with a suspension system, coupled with a pneumatic system, coupled with springs or other resilient members, etc.).

Figure 5:
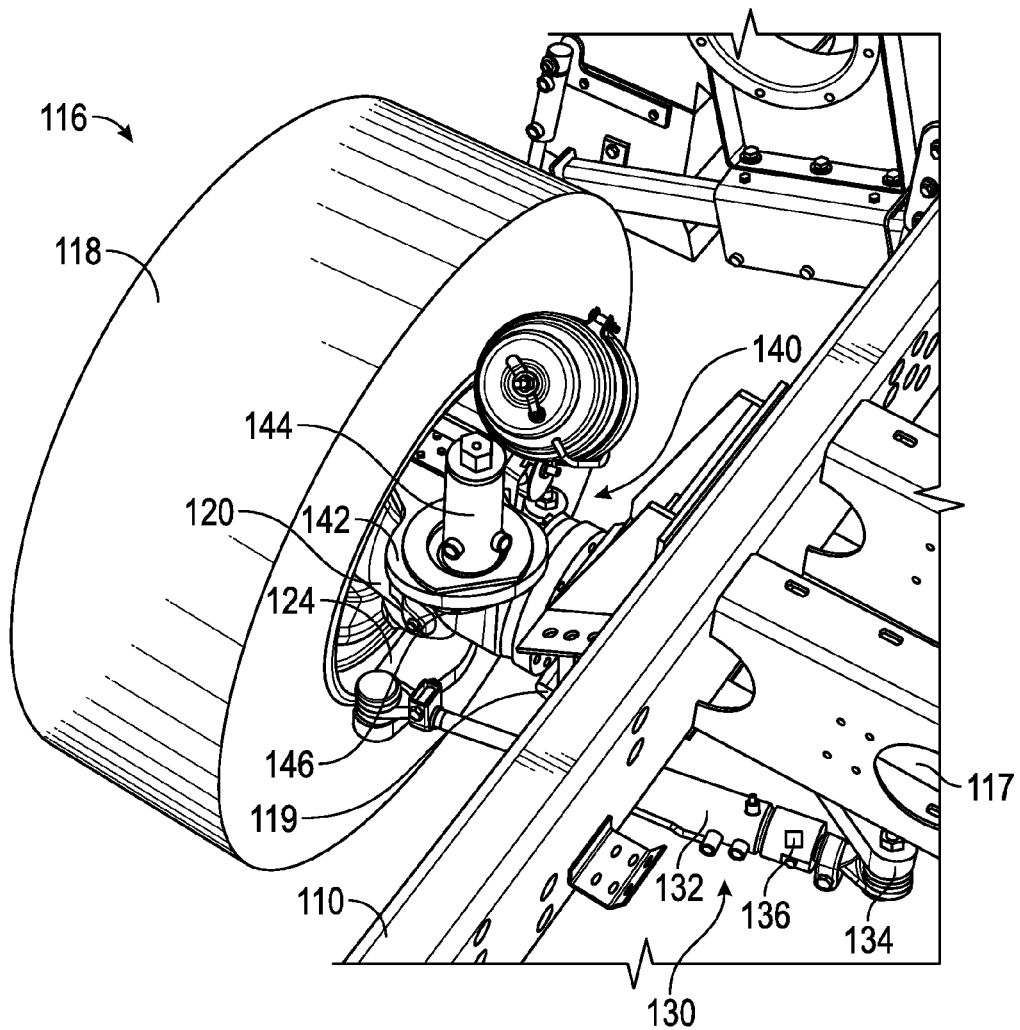
Figure 6:
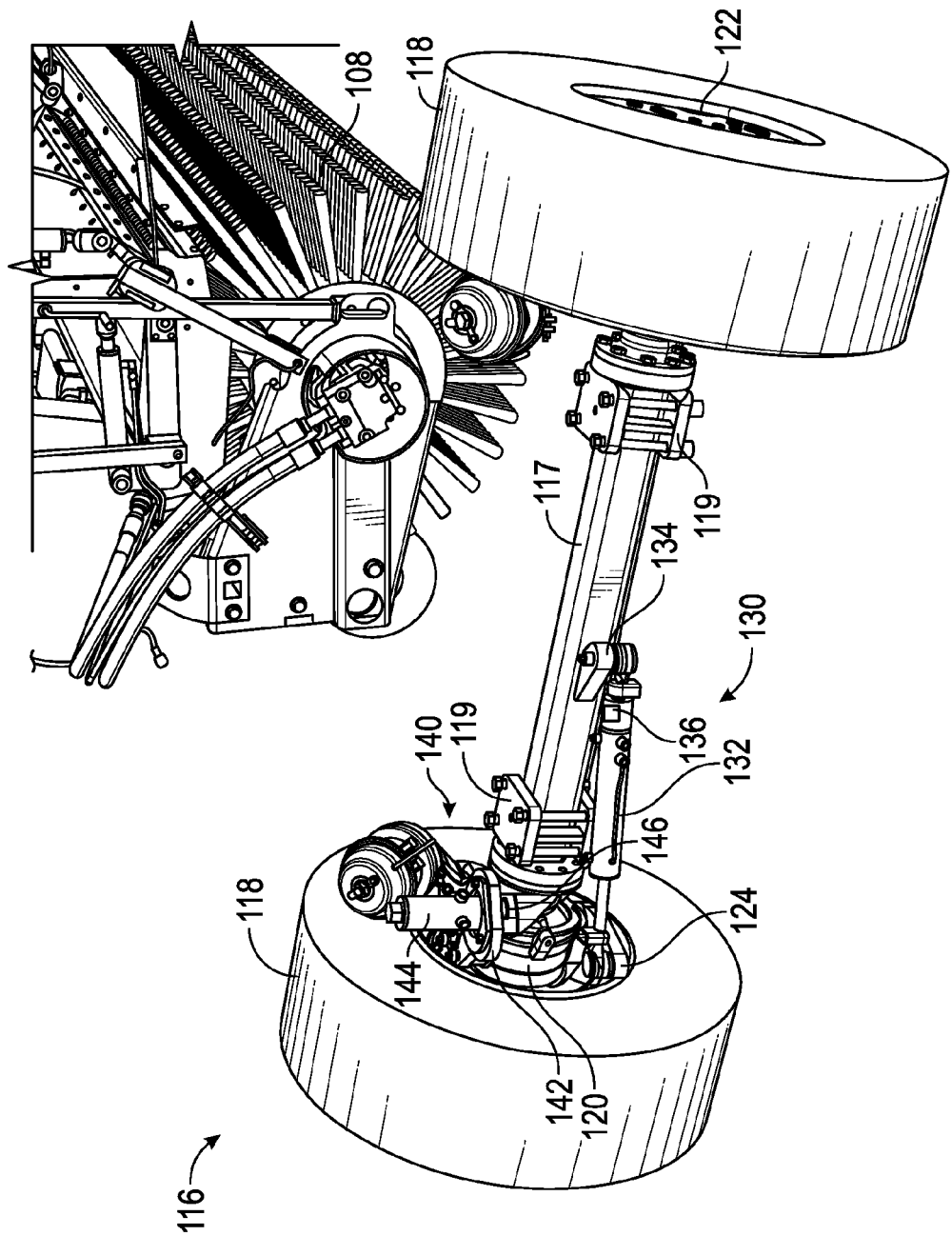
Figure 7:
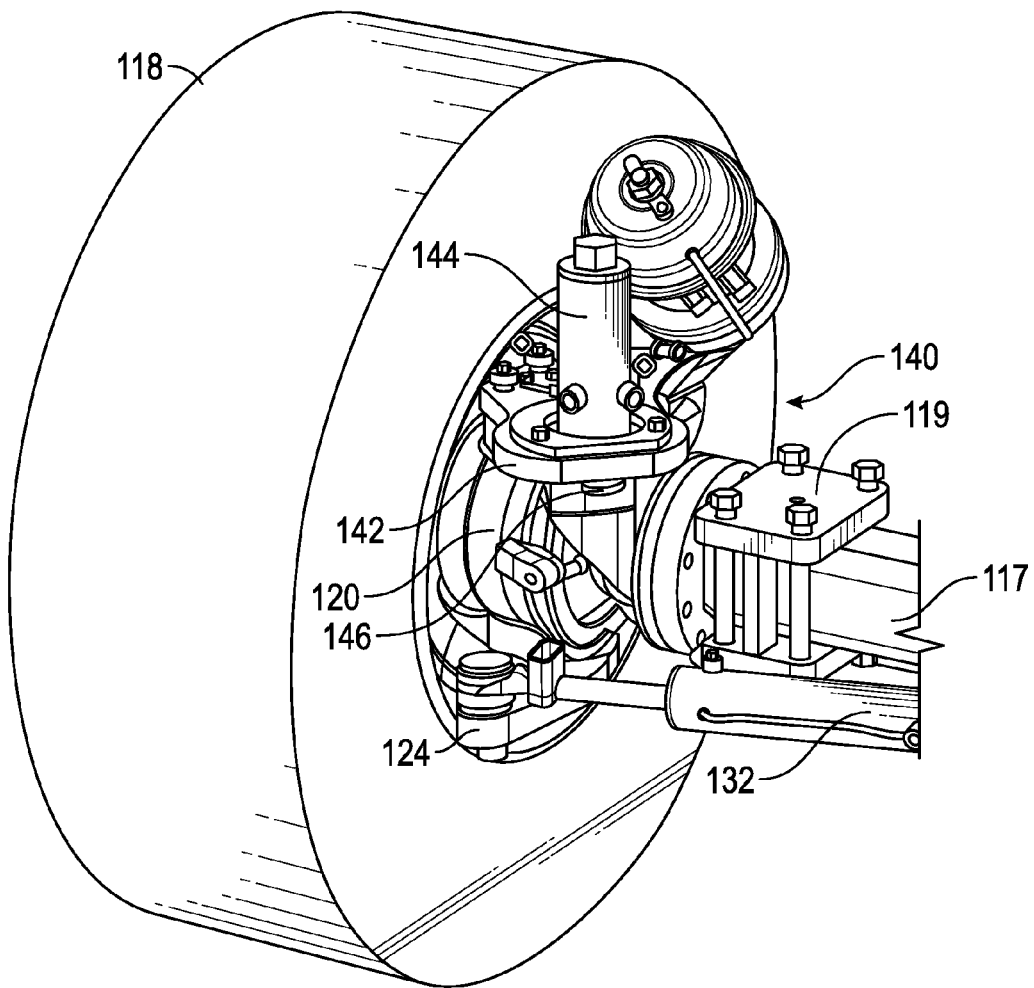
Figure 8:
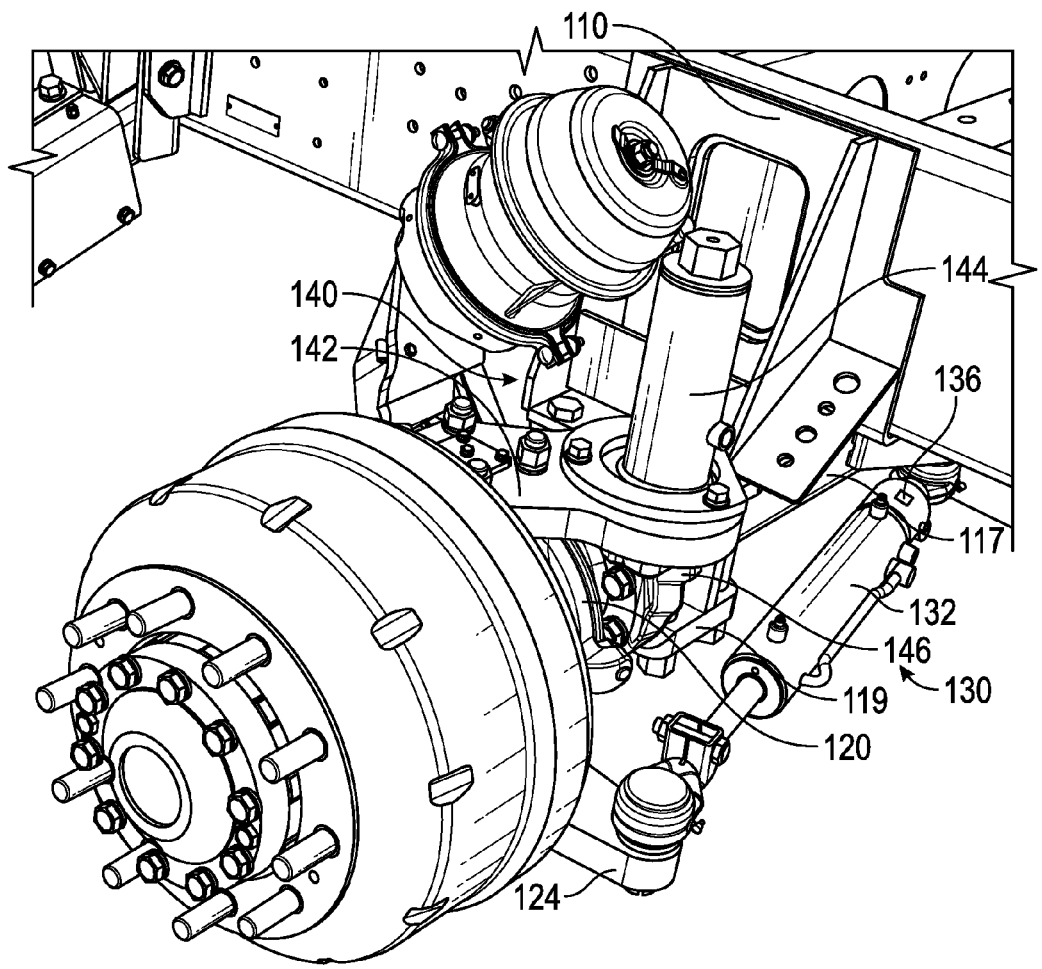
Figure 9:
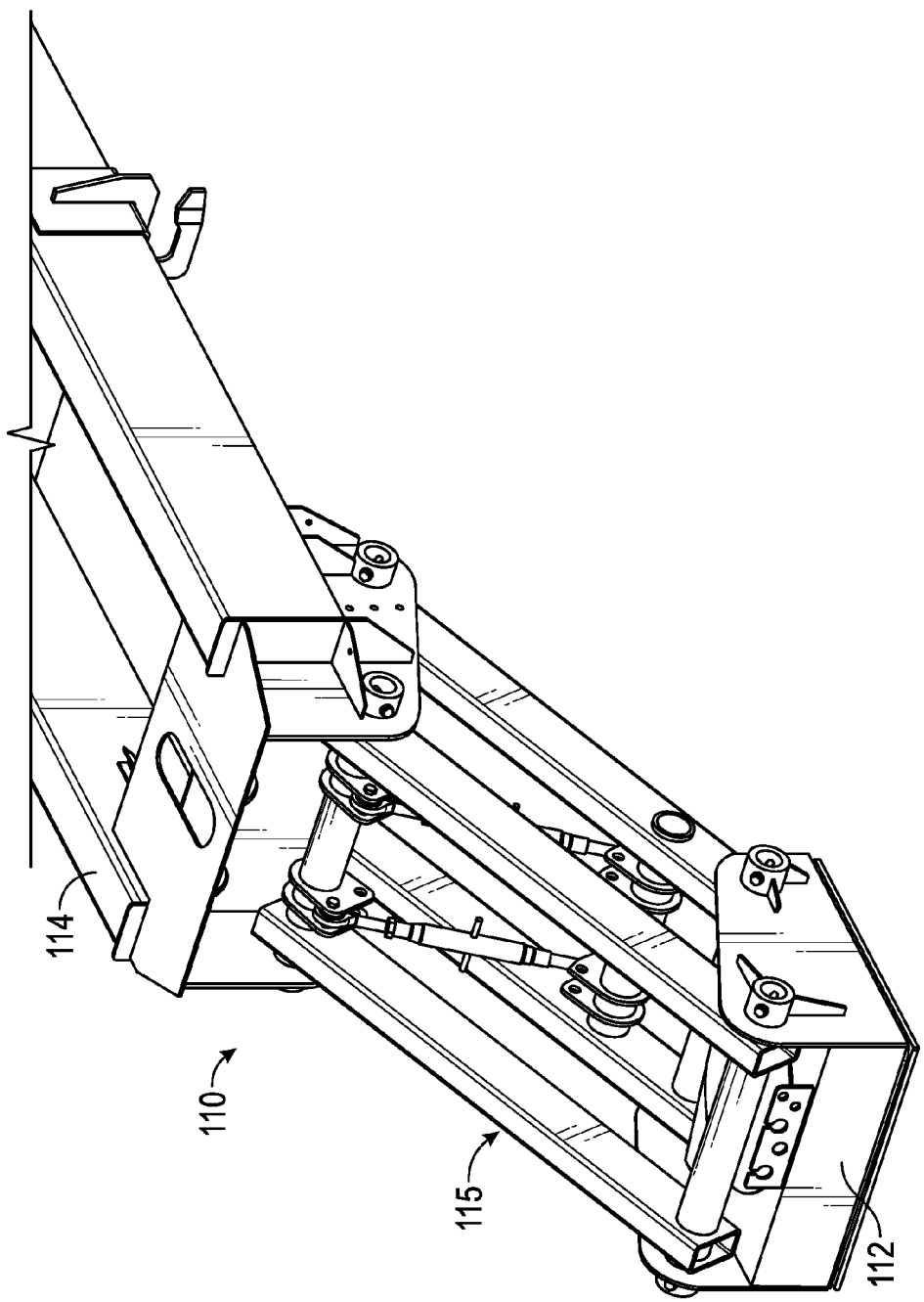
FIGS. 9-12 are partial perspective views of the hitch portion of a trailer for a snow removal vehicle, according to an exemplary embodiment.

According to the embodiment shown in FIGS. 4-8, axle assembly 116 includes a steering assembly 130 that turns hub 120 and hub 122 (e.g., about a kingpin axis) to steer wheels 118. As shown in FIG. 5, steering assembly 130 includes an actuator, shown as steering cylinder 132, positioned to directly steer hub 120. In one embodiment, steering cylinder 132 is a hydraulic cylinder. In other embodiments, steering cylinder 132 is a pneumatic cylinder. In still other embodiments, another type of actuator is positioned to steer hub 120 (e.g., a rotational actuator, another type of linear actuator, etc.). A steering control system may control the operation of steering cylinder 132 in order to steer wheels 118 based on a steering control strategy.

Steering cylinder 132 may be coupled to frame 110 of snow removal vehicle 100. As shown in FIG. 5, a first end of steering cylinder 132 is coupled to frame member 117 with a plate, shown as ear 134, and a second end of steering cylinder 132 is coupled to hub 120 with an arm, shown as steering arm 124. In other embodiments, the first end of steering cylinder 132 is directly coupled with frame 110 of trailer 104. As shown in FIG. 5, ball joints couple steering cylinder 132 with ear 134 and steering arm 124. In other embodiments, steering cylinder 132 is otherwise coupled to ear 134 and steering arm 124. Extension and retraction of steering cylinder 132 steers wheels 118. By way of example, extension of steering cylinder 132 applies a force laterally outward on steering arm 124 that turns hub 120 in a first direction (e.g., turns hub 120 clockwise). By way of further example, retraction of steering cylinder 132 applies a force laterally inward on steering arm 124 that turns hub 120 in an opposing second direction (e.g., turns hub 120 counterclockwise).

In one embodiment, steering assembly 130 includes a drag link that couples the movement of hub 120 and hub 122. Rotatably coupling hub 120 and hub 122 may facilitate the steering of trailer 104 with a single actuator (e.g., a single steering cylinder 132 may steer both hub 120 and hub 122). In one embodiment, the drag link is coupled to hub 120 and hub 122 with a pair of arms (e.g., steering arms). The drag link may extend laterally across a longitudinal axis of trailer 104 (e.g., parallel to frame member 117). The drag link transfers the steering force applied to hub 120 by steering cylinder 132 to hub 122. By way of example, extension of steering cylinder 132 may apply a steering force laterally outward to rotate hub 120 clockwise, and the drag link may transfer the steering force to rotate hub 122 clockwise. In one embodiment, the drag link is coupled to hub 120 forward of an axis of rotation for wheel 118 (e.g., the kingpin axis), and steering cylinder 132 is coupled to hub 120 rearward of the axis of rotation for wheel 118. In other embodiments, both the drag link and steering cylinder 132 are coupled forward or rearward of the axis of rotation for wheel 118. In other embodiments, axle assembly 116 may include a pair of steering cylinders 132 to individually steer hub 120 and hub 122.

Referring again to the exemplary embodiment shown in FIGS. 4-8, axle assembly 116 includes a locking mechanism, shown as locking mechanism 140. A steering control system may be configured to selectively secure wheels 118 by engaging locking mechanism 140. In one embodiment, the steering control system may receive a user input or other input relating to a command to secure wheels 118. By way of example, a user command to secure the orientation of wheels 118 may be provided to a processing circuit (e.g., after wheels 118 are centered, etc.).

According to the embodiment shown in FIGS. 4-8, locking mechanism 140 includes a first plate, shown as support plate 142, that couples an actuator, shown as locking cylinder 144, to hub 120. Support plate 142 and locking cylinder 144 turn with hub 120 relative to a second plate, shown as locking plate 146. Locking plate 146 remains stationary as steering cylinder 132 turns hub 120.

In one embodiment, locking cylinder 144 includes a locking pin that is moveable between an extended position and a retracted position. With the locking pin in the retracted position, support plate 142 and locking cylinder 144 are movable, and wheel 118 may be steered. In one embodiment, locking plate 146 defines an aperture configured to receive an end of the locking pin. Locking cylinder 144 may move the locking pin into the extended position, where an end of the locking pin interfaces with the aperture within locking plate 146 to secure wheel 118. In another embodiment, locking cylinder 144 includes a resilient member (e.g., a spring) positioned to bias the locking pin into the extended position. Pneumatic pressure may overcome the spring force to retract the locking pin, thereby allowing wheel 118 to be steered.

In one embodiment, wheel 118 may be selectively secured. By way of example, wheel 118 may be secured in a straight-ahead orientation. The aperture in locking plate 146 may be positioned to facilitate securing wheel 118 in only the straight-ahead orientation. With wheels 118 turned, the locking pin of locking cylinder 144 may be offset from the aperture within locking plate 146. Rotation of wheels 118 into a straight-ahead orientation may align the locking pin with the aperture within locking plate 146. With wheels 118 in a straight-ahead orientation, the locking pin may be extended into the aperture within locking plate 146 (e.g., with the application of pneumatic pressure, due to a biasing force from an air-released spring, etc.), thereby securing wheels 118. In other embodiments, locking mechanism 140 otherwise selectively secures wheels 118.

In still other embodiments, locking cylinder 144 and support plate 142 may remain stationary as steering cylinder 132 turns hub 120. As shown in FIGS. 4-8, locking mechanism 140 is coupled to frame member 117 of axle assembly 116. In other embodiments, locking mechanism 140 is directly coupled to frame 110 of trailer 104. As shown in FIGS. 4-8, axle assembly 116 includes a single locking mechanism 140. By way of example, a drag link may couple the movements of hub 120 and hub 122 such that a locking mechanism 140 that secures hub 120 also secures hub 122. In other embodiments, axle assembly 116 includes a pair of locking mechanisms 140 to individually secure the positions of hub 120 and hub 122.

Referring still to FIGS. 4-8, axle assembly 116 includes a sensor, shown as sensor 136. Sensor 136 may facilitate determining the position of one or more components (e.g., steering cylinder 132, hub 120, hub 122, etc.). As shown in FIG. 5, sensor 136 is a linear position sensor. In other embodiments, sensor 136 is another type of sensor (e.g., a rotational position sensor, etc.). As shown in FIGS. 4-8, sensor 136 is integrated within steering cylinder 132. Sensor 136 may detect the position of steering cylinder 132 (e.g., the position of a movable rod relative to a cylinder, etc.) and provide a sensor signal relating to the position thereof to a remote processing circuit of snow removal vehicle 100. The sensor signal may be used to determine a current position of at least one of steering cylinder 132, hub 120, hub 122, and trailer 104. Sensor 136 may be coupled to steering cylinder 132 such that the particular location of sensor 136 is dependent upon the current position and actuation of steering cylinder 132. The position of steering cylinder 132 may be measured in relation to any reference point on frame 110, snow removal vehicle 100, or any other reference point. In one embodiment, the remote processing circuit uses the sensor signals to evaluate the position of at least one of steering cylinder 132, hub 120, and hub 122 and sends a command signal to locking mechanism 140 when hub 120 and hub 122 are positioned in a straight-ahead orientation (e.g., to exhaust a pneumatic pressure opposing a biasing spring, to directly insert the locking pin into the aperture, etc.).

Figure 10:
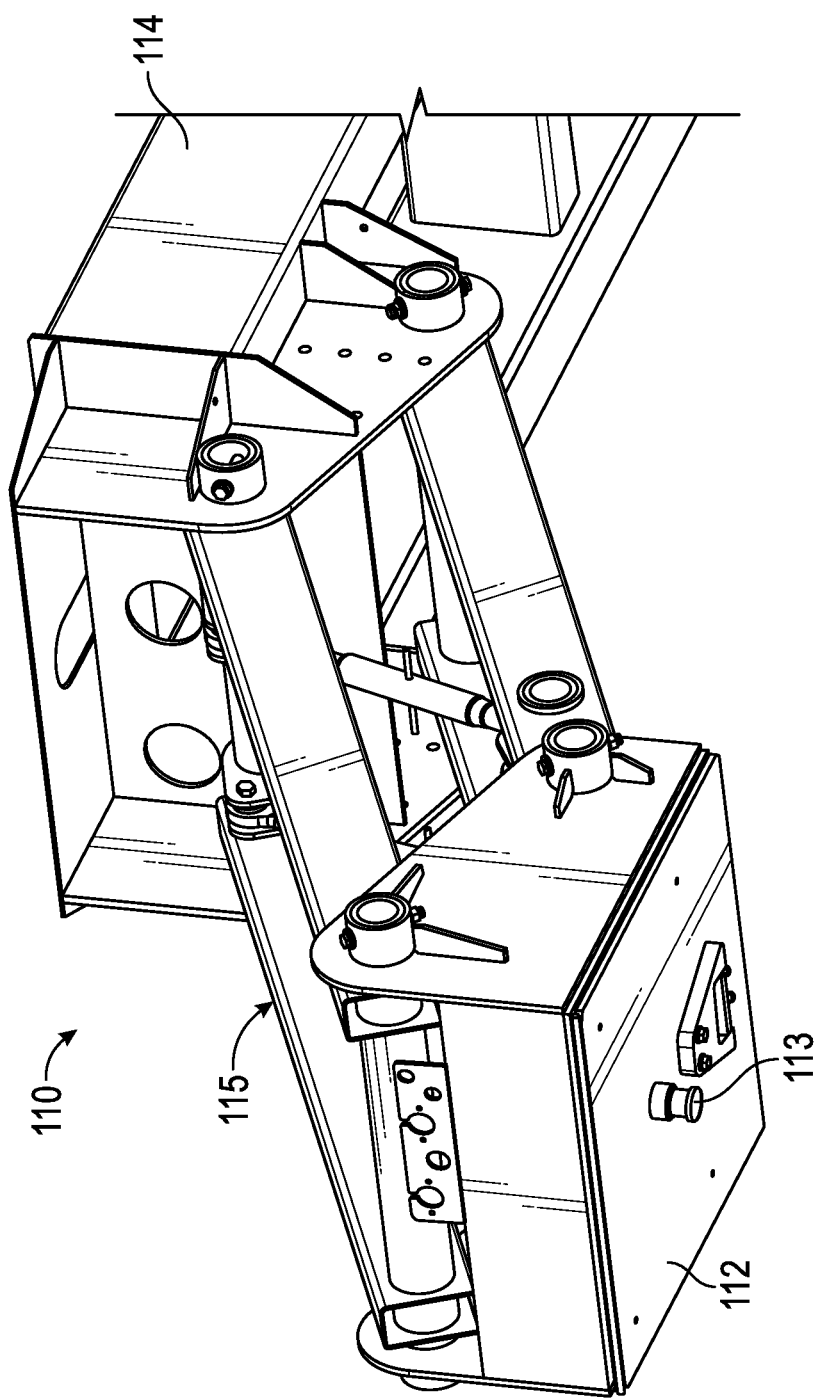

Referring next to FIGS. 9-12, frame 110 includes a hitch 112 and a chassis 114. A connecting assembly 115 couples hitch 112 with chassis 114. As shown in FIGS. 9-12, connecting assembly 115 includes a plurality of tubular frame members and a pair of actuators. In one embodiment, the actuators may be extended to elevate chassis 114 or retracted to lower chassis 114. As shown in FIG. 10, hitch 112 includes a hitch stud 113 configured to couple frame 110 to the tractor of the snow removal vehicle. By way of example, forward pulling forces and rearward pushing forces, among other forces, may be transferred from the tractor to frame 110 through hitch stud 113.

Figure 11:
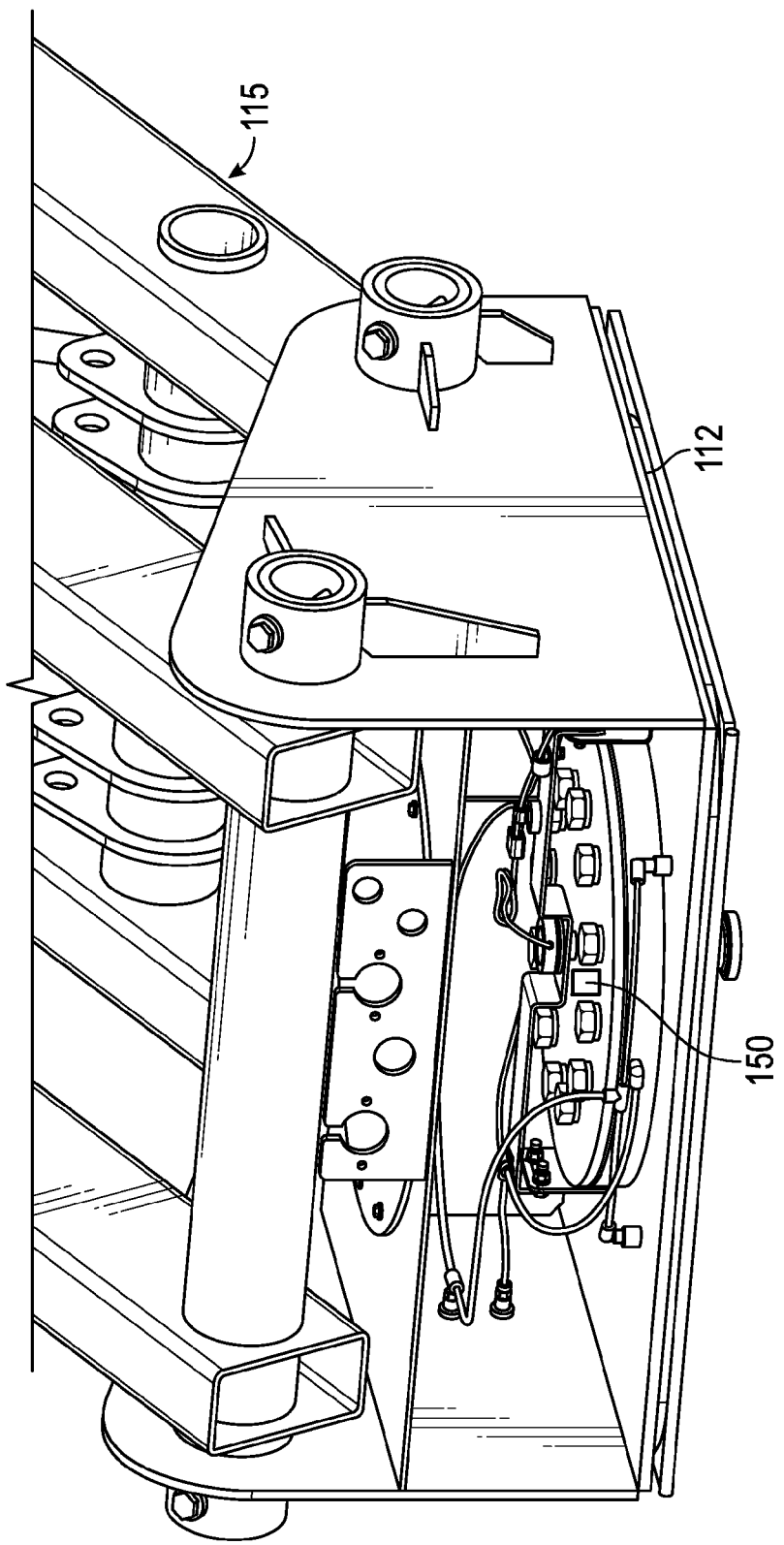
Figure 12:
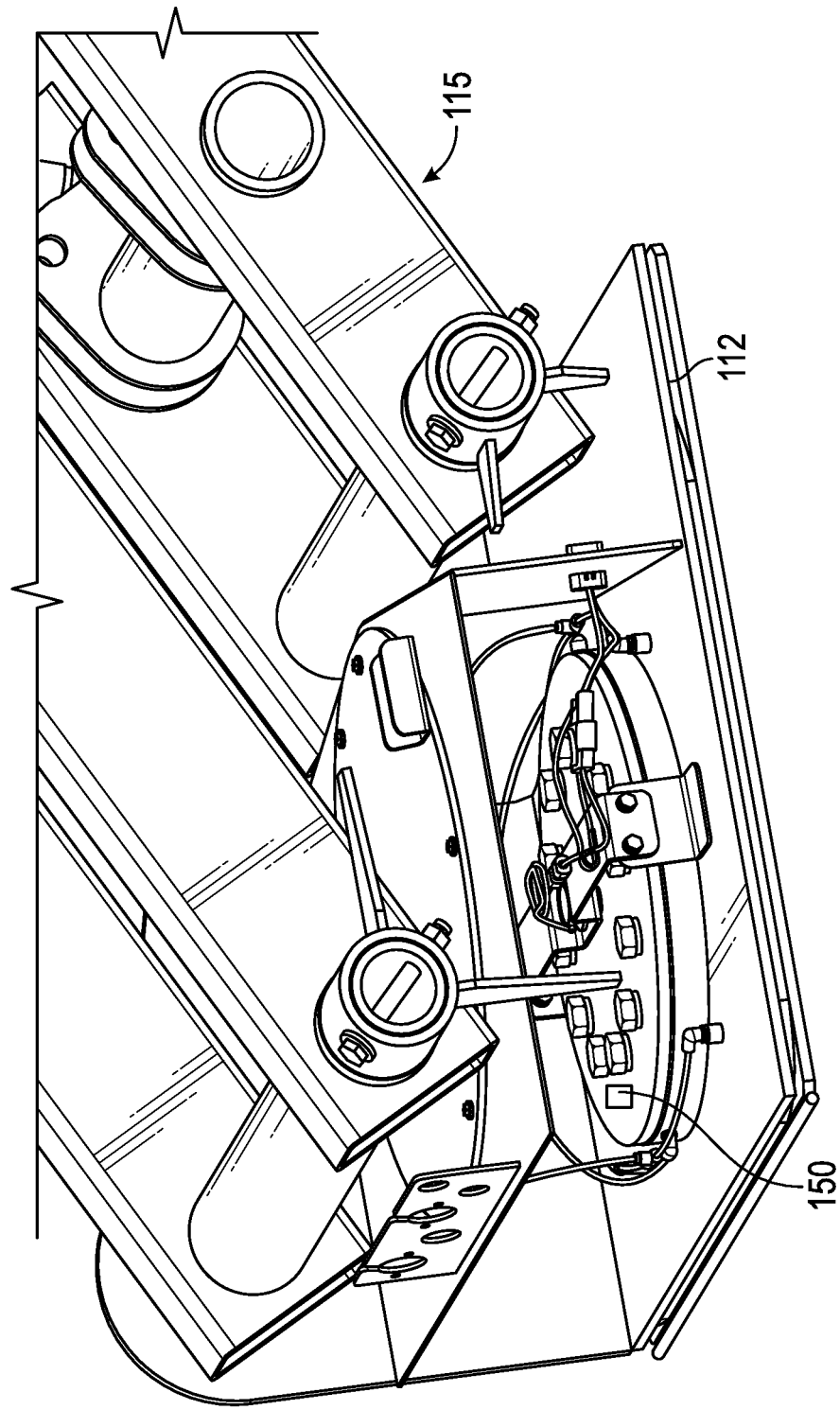
Figure 13A:
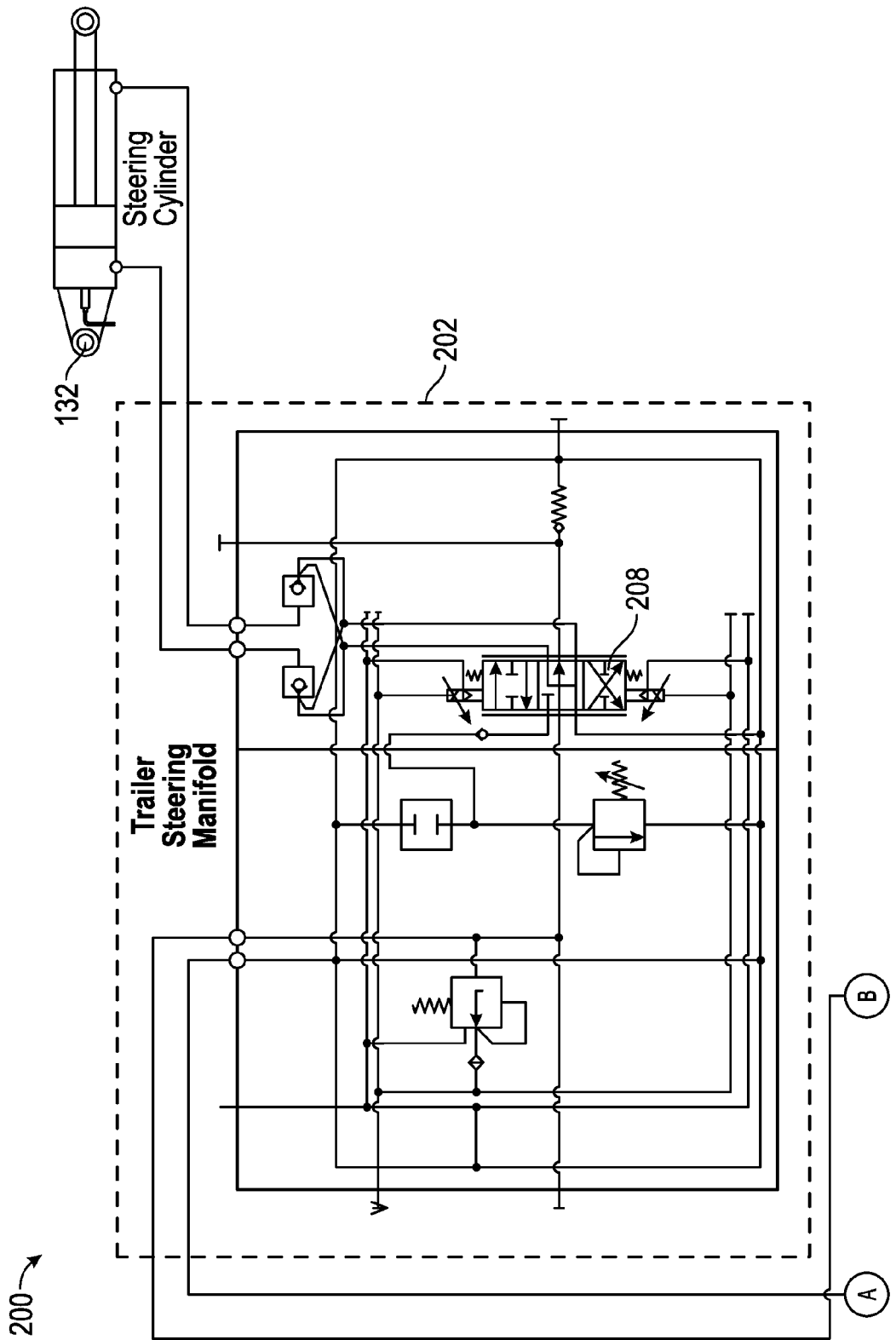
FIGS. 13A-13F is a schematic diagram of a trailer steering and snow removal system, according to an exemplary embodiment.
Figure 13B:
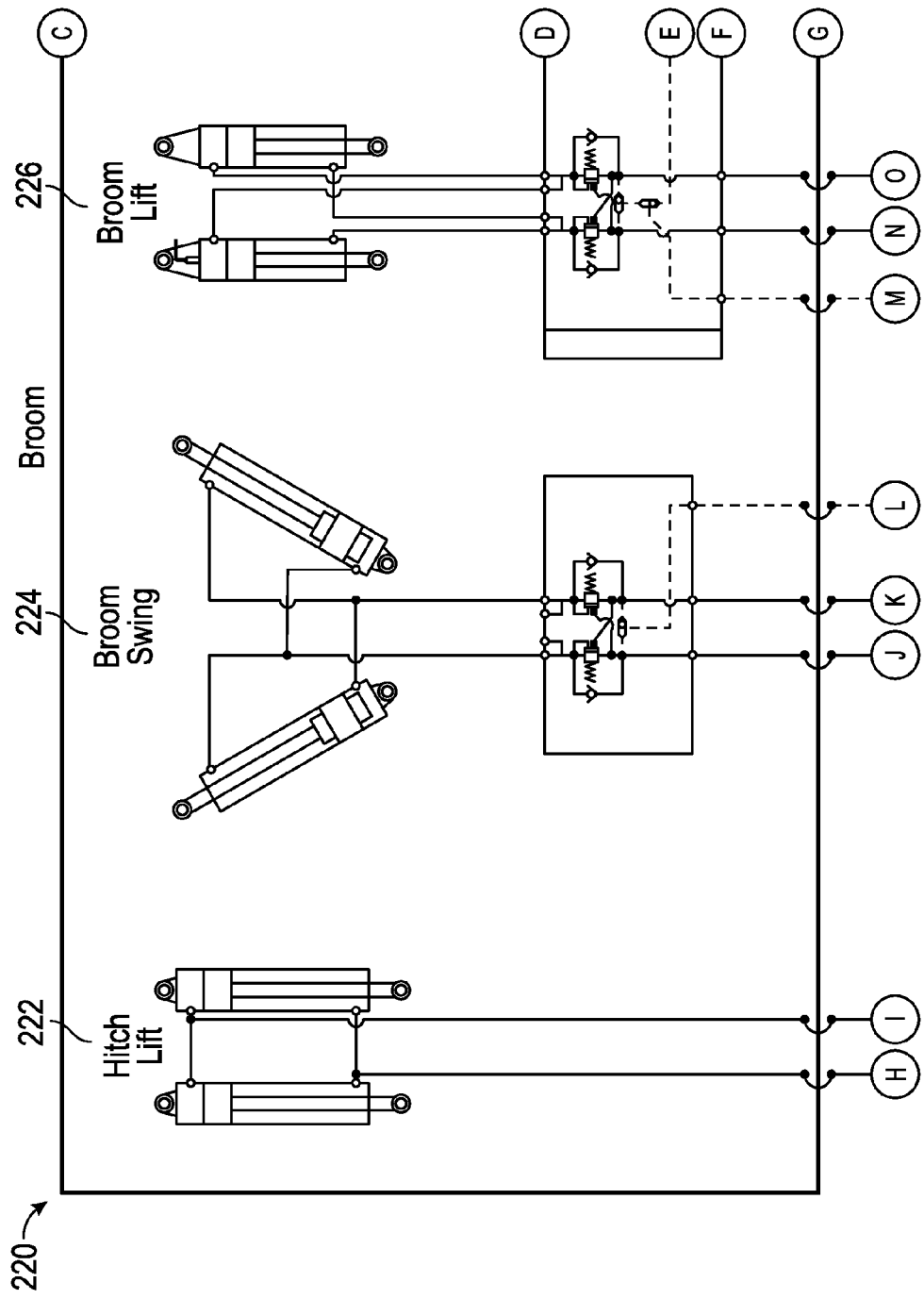
Figure 13C:
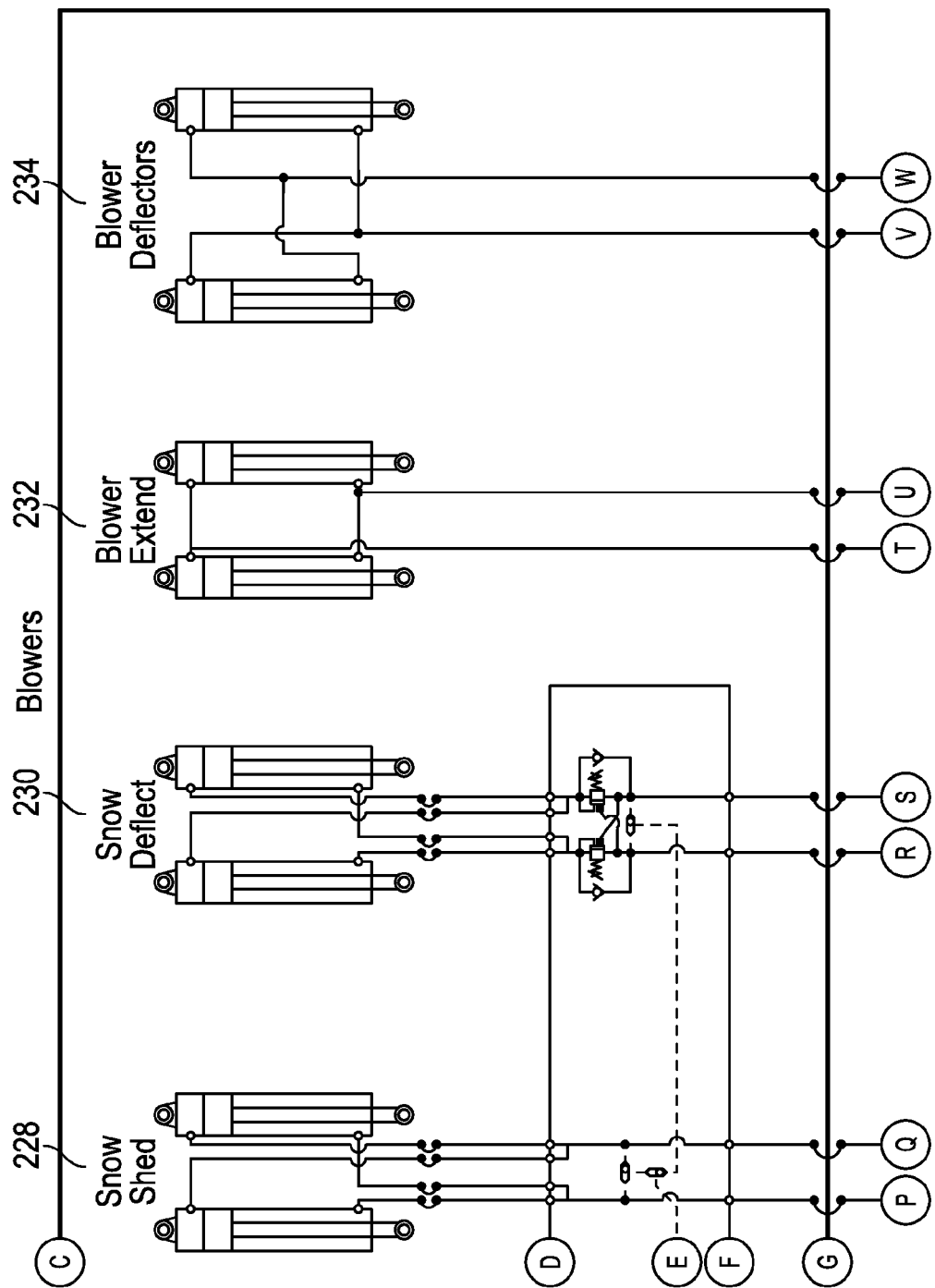
Figure 13D:
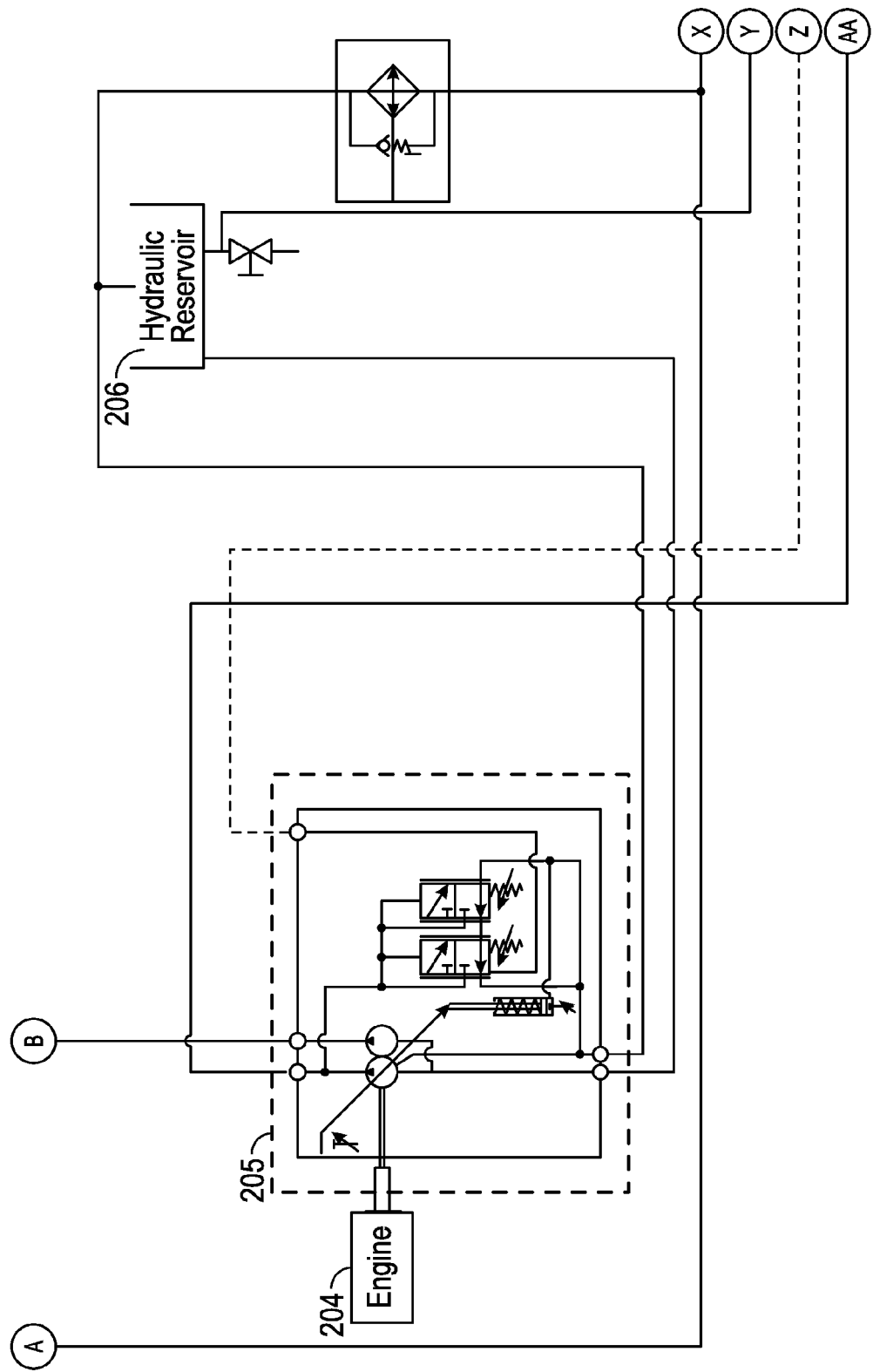
Figure 13E:
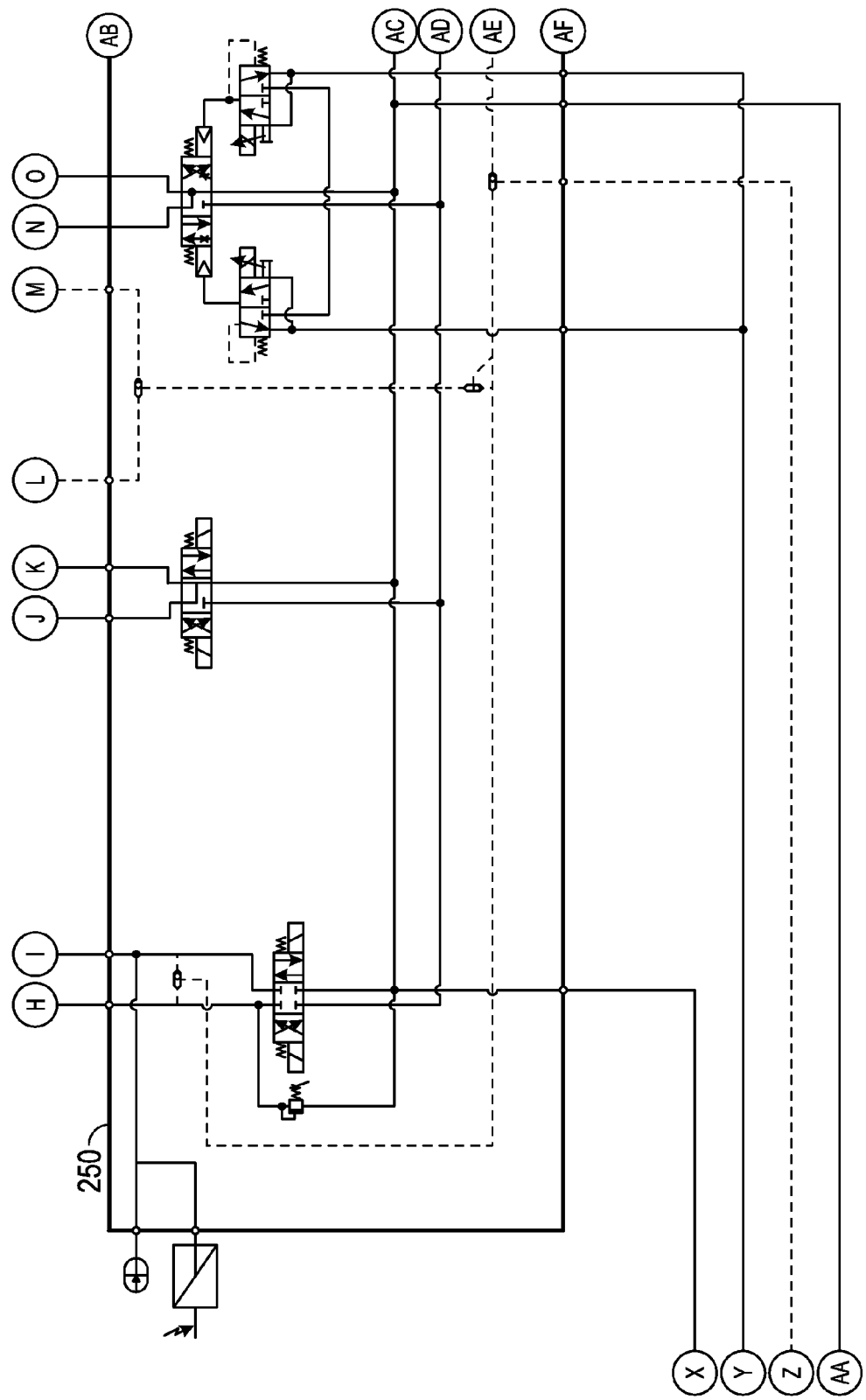
Figure 13F:
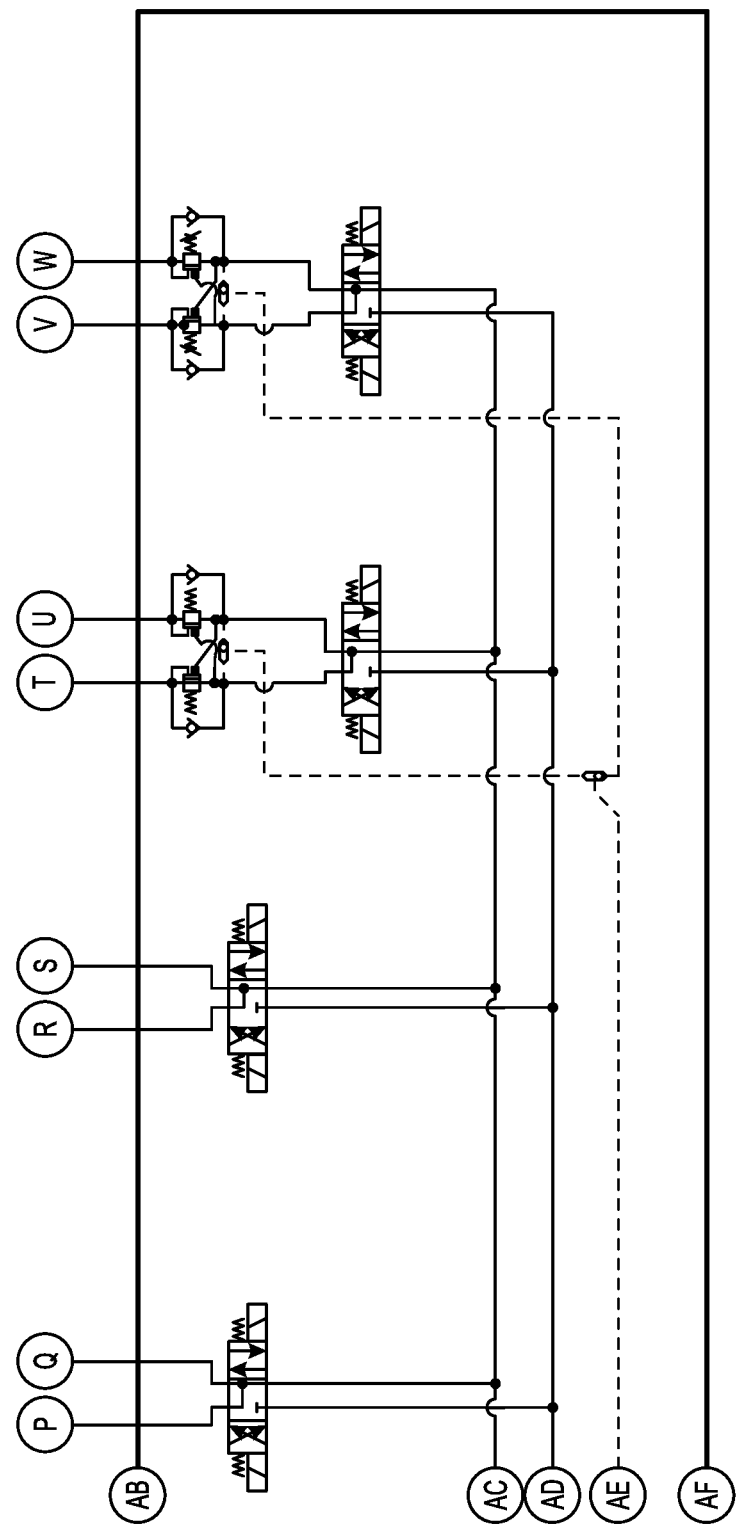

As shown in FIGS. 11-12, a hitch angle sensor 150 is coupled to hitch 112. According to the embodiment shown in FIG. 11, hitch angle sensor 150 is positioned within an enclosed box section of hitch 112. In other embodiments, hitch angle sensor 150 is otherwise coupled to hitch 112. Hitch angle sensor 150 is configured to provide sensor signals relating to the hitch angle of the trailer relative to the tractor, according to an exemplary embodiment. The hitch angle indicates a position of the trailer behind the tractor. The hitch angle may be an angle measured from any reference on hitch 112, frame 110, or snow removal vehicle 100. Hitch angle sensor 150 may provide a sensor input relating to the hitch angle to a remote processing circuit of snow removal vehicle 100. The sensor input may be used to determine a target position for a component of a trailer (e.g., a target position for a steering cylinder, a target position of a trailer wheel, a target position of the entire trailer). The target position is a position of the component that allows the trailer to follow the path of the tractor during travel, according to one embodiment.

Referring next to the schematic diagram shown in FIGS. 13A-13F, a trailer steering system 200 and a snow removal system 220 may operate various components of a trailer. In one embodiment, trailer steering system 200 and snow removal system 220 are hydraulic systems, and the diagrams shown in FIGS. 13A-13F are hydraulic diagrams. In other embodiments, at least one of trailer steering system 200 and snow removal system 220 is another type of system (e.g., a pneumatic system, an electrical system, etc.).

As shown schematically in FIGS. 13A-13F, trailer steering system 200 includes steering cylinder 132. In one embodiment, steering cylinder 132 engages a steering arm to steer at least one wheel of the trailer. As shown in FIGS. 13A-13F, steering cylinder 132 is coupled to a trailer steering manifold 202. Trailer steering manifold 202 is a hydraulic manifold configured to regulate fluid flow between the actuators (e.g., steering cylinder 132) and the pumps of the hydraulic system of the vehicle. According to the embodiment shown in FIGS. 13A-13F, trailer steering manifold 202 includes a valve 208 for affecting pressure in steering cylinder 132. In one embodiment, valve 208 includes an electronic solenoid valve coupled to a movable valve gate such that valve 208 is electronically adjustable. A variable output from a steering control system may be provided to valve 208. In one embodiment, movement of the valve gate provides differing levels (e.g., flow rates, pressures, etc.) of fluid to steering cylinder 132, thereby changing the position of steering cylinder 132 or the force applied by steering cylinder 132.

Referring still to FIGS. 13A-13F, trailer steering system 200 further includes an engine 204 coupled to a pump 205. As shown in FIGS. 13A-13F, pump 205 is a hydraulic pump. In other embodiments, pump 205 is a pneumatic pump or another type of device. In one embodiment, engine 204 rotates pump 205 to provide pressurized fluid to other components of trailer steering system 200 and snow removal system 220. By way of example, engine 204 may be a diesel combustion engine. By way of another example, pump 205 may be powered by an electric motor.

Trailer steering system 200 further includes a tank, shown as hydraulic reservoir 206. In other embodiments, the tank is a pneumatic tank or a vessel configured to store another working fluid. Hydraulic reservoir 206 holds excess hydraulic fluid resulting from changes in the extension or contraction of steering cylinder 132 and other changes in trailer steering system 200 and snow removal system 220.

As shown schematically in FIGS. 13A-13F, snow removal system 220 includes a plurality of actuators associated with the broom and blowers of a snow removal vehicle. According to the embodiment shown in FIGS. 13A-13F, snow removal system 220 includes hitch height adjustment actuators 222, broom swing actuators 224, broom lift actuators 226, snow shed actuators 228, snow deflect actuators 230, blower extend actuators 232, and blower deflector actuators 234. In one embodiment, at least one of hitch height adjustment actuators 222, broom swing actuators 224, broom lift actuators 226, snow shed actuators 228, snow deflect actuators 230, blower extend actuators 232, and blower deflector actuators 234 are hydraulic cylinders. As shown in FIGS. 13A-13F, each of hitch height adjustment actuators 222, broom swing actuators 224, broom lift actuators 226, snow shed actuators 228, snow deflect actuators 230, blower extend actuators 232, and blower deflector actuators 234 are hydraulic cylinders. In other embodiments, at least one of hitch height adjustment actuators 222, broom swing actuators 224, broom lift actuators 226, snow shed actuators 228, snow deflect actuators 230, blower extend actuators 232, and blower deflector actuators 234 is another type of actuator (e.g., an electric actuator, a pneumatic actuator, etc.).

The actuators of snow removal system 220 are positioned to engage a component of a snow removal vehicle (e.g., a broom, a blower, etc.) to facilitate the performance of a snow removal function (e.g., adjust the position of the broom, etc.). In one embodiment, the actuators are electronically controlled (e.g., electronically actuated, coupled to an electronically controlled valve, etc.). Such electronically controlled actuators may be operated based on user input or operated as part of a broom and blower control scheme. As shown in FIGS. 13A-13F, snow removal system 220 includes a plurality of actuator pairs positioned to perform various snow removal functions. In other embodiments, snow removal system 220 includes a single actuator positioned to perform a snow removal function. In still other embodiments, snow removal system 220 includes more than two actuators positioned to perform a snow removal function.

As shown in FIGS. 13A-13F, circuitry, shown as hydraulic circuitry 250, couples snow removal system 220 with trailer steering system 200. In one embodiment, hydraulic circuitry 250 facilitates the transmission of pressurized hydraulic fluid from pump 205 to the actuators of snow removal system 220. According to the embodiment shown in FIGS. 13A-13F, hydraulic circuitry 250 is local to snow removal system 220. In other embodiments, various control circuitry for at least one of a broom and a blower may be located remotely from snow removal system 220. Hydraulic circuitry 250 may be coupled to other subsystems of a snow removal vehicle.

Referring still to FIGS. 13A-13F, snow removal system 220 includes hitch height adjustment actuators 222, broom swing actuators 224, broom lift actuators 226, snow shed actuators 228, snow deflect actuators 230, blower extend actuators 232, and blower deflector actuators 234. Hitch height adjustment actuators 222 are configured to level a trailer relative to a ground surface (e.g., front-to-back level, etc.), according to one embodiment. When actuated, broom swing actuators 224 may adjust the deployed angle of the broom (e.g., the angle of the broom relative to the snow removal vehicle, the angle of the broom relative to the ground surface, etc.). Broom lift actuators 226 are positioned to vary the height of the broom relative to the ground surface. In one embodiment, broom lift actuators 226 may raise or lower the position of the broom without adjusting the position of the frame of the trailer. Snow shed actuators 228 and snow deflect actuators 230 are positioned to facilitate the deflection or removal of snow and other debris away from broom 108 and trailer 104 by raising or lowering a shed, deflector, or other apparatus coupled to at least one of the broom and the trailer, according to one embodiment. In other embodiments, snow removal system 220 includes more or fewer actuators positioned to perform various snow removal functions.

According to one embodiment, a snow removal vehicle includes a blower positioned to produce an air stream that directs snow and other debris from the broomed surface. Snow removal system 220 includes blower extend actuators 232 and blower deflector actuators 234 to facilitate the operation of the blower. Blower extend actuators 232 may be coupled to the blower and configured to vary the position thereof (e.g., by extending the blower laterally outward from the trailer, by extending the blower closer to the broom, etc.). Blower deflector actuators 234 may be coupled to a blower deflector and configured to vary the position thereof. By way of example, the blower deflector may facilitate the removal of debris and snow by directing the stream of air produced by the blower.

Figure 14:
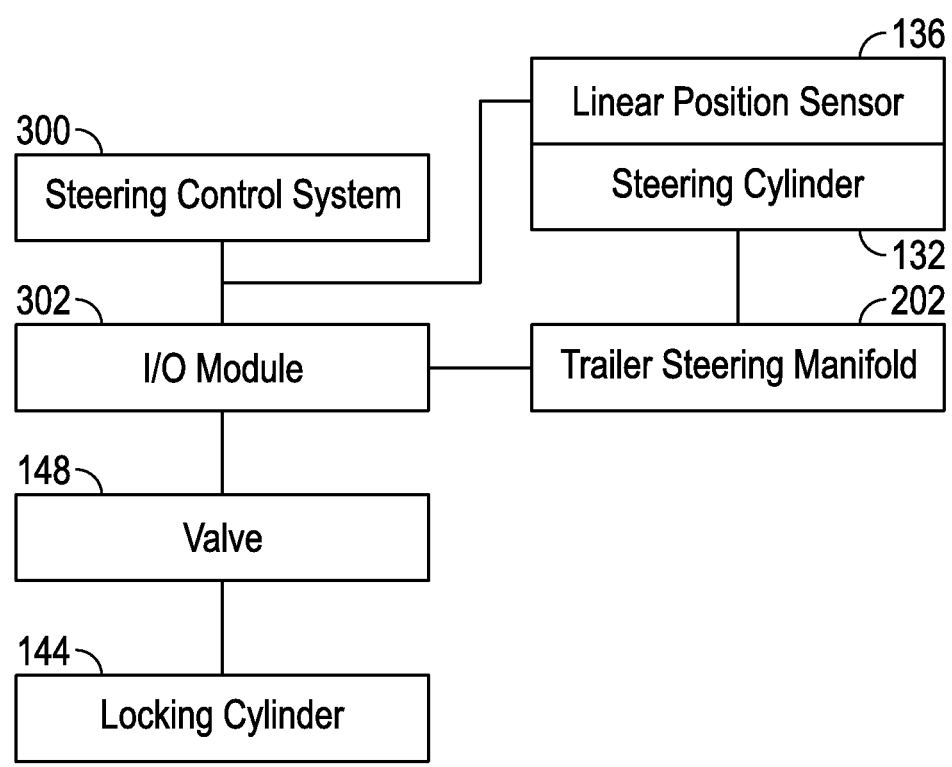
FIG. 14 is a block diagram of a system architecture for steering a trailer, according to an exemplary embodiment.
Figure 15:
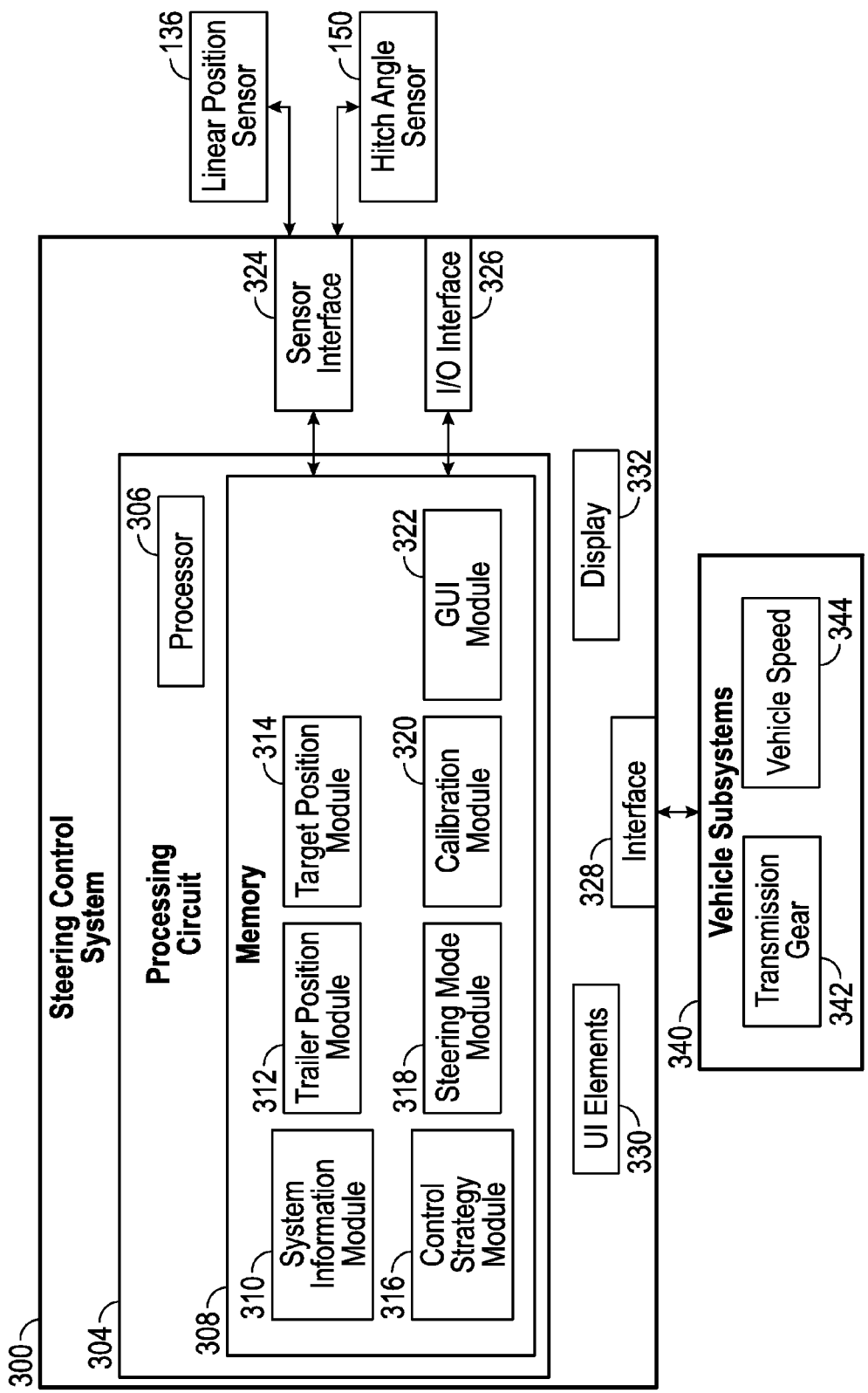
FIG. 15 is a detailed block diagram of a steering control system for steering a trailer, according to an exemplary embodiment.

Referring next to the block diagrams shown in FIGS. 14-15, a steering control system 300 is used to control the steering of a pair of tractive elements of a trailer (e.g., trailer 104). Steering control system 300 may be implemented to steer one or more axles of a trailer. As shown in FIG. 14, steering control system 300 interacts with various other components of a vehicle (e.g., snow removal vehicle 100) to control a trailer (e.g., trailer 104). Steering control system 300 may be a controller configured to generate a control strategy for trailer 104. The control strategy may include one or more settings related to at least one of steering cylinder 132 and locking cylinder 144. In one embodiment, the control strategy includes adjusting the position of one or more actuators, thereby selectively locking and adjusting the position of the wheels. By adjusting the position of the wheels, the trailer may be controllably steered into a different position. By way of example, a control strategy may include settings that center the wheels of trailer 104, preventing the wheels from additively steering trailer 104. By way of another example, a control strategy may include settings that steer the wheels of trailer 104 in the same direction as the wheels of tractor 102. By way of still another example, a control strategy may include settings that steer the wheels of trailer 104 in an opposing direction relative to the wheels of tractor 102.

Trailer steering manifold 202 receives an input relating to the control strategy from steering control system 300 via an input/output (I/O) module 302. The control strategy may indicate to trailer steering manifold 202 a desired actuation of steering cylinder 132 (e.g., extension, refraction, etc.). In one embodiment, valve 208 is actuated to control the position of steering cylinder 132. I/O module 302 may be configured to receive input from steering control system 300 and to provide the input to trailer steering manifold 202.

In the embodiment shown in FIG. 14, a valve 148 (e.g., a high-flow electric solenoid valve having a quick-release feature, etc.) is coupled to I/O module 302 and locking cylinder 144. By way of example, valve 148 may be electrically coupled to I/O module 302 (e.g., with an analog connection, with a J1939 databus connection, etc.). In other embodiments, valve 148 includes a solenoid valve, and a quick release valve is disposed between valve 148 and locking cylinder 144. Valve 148 may be in fluid communication with locking cylinder 144. In one embodiment, valve 148 is disposed between locking cylinder 144 and a pressurized fluid source (e.g., a pressurized reservoir, a pump, etc.). Opening valve 148 may expose locking cylinder 144 to a pressurized fluid (e.g., a pressurized liquid, a pressurized gas, etc.). In one embodiment, locking cylinder 144 retracts the locking pin when exposed to the pressurized fluid, thereby allowing rotation of the wheels (e.g., to steer). In another embodiment, locking cylinder 144 extends the locking pin when exposed to the pressurized fluid, thereby securing the position of the wheels (e.g., in a straight-ahead orientation). Valve 148 may be a solenoid valve or another type of valve that may be electronically controlled through signals sent and received by I/O module 302.

Referring still to FIG. 14, sensor 136 may provide a sensor input to steering control system 300. By way of example, the sensor input may relate to the position of steering cylinder 132. In one embodiment, sensor 136 is integrated as part of steering cylinder 132. In other embodiments, sensor 136 is otherwise positioned. In still other embodiments, a sensor (e.g., a linear position sensor, a rotational position sensor, etc.) is configured to provide sensor signals relating to another steering component (e.g., the angular position of a hub, a position of a steering arm, etc.). Steering control system 300 may use the sensor input to determine a current position of steering cylinder 132 or another component of a trailer. The current position may be used to help determine a control strategy for adjusting the position of steering cylinder 132.

Referring to FIG. 15, a block diagram of steering control system 300 is shown in greater detail. As described above, steering control system 300 may be configured to generate a control strategy for steering a trailer of a snow removal vehicle. Steering control system 300 may generally receive various sensor inputs relating to the position of a steering cylinder, the trailer, a transmission gear, and the vehicle speed, among other characteristics. A control strategy may be generated based on the transmission gear, vehicle speed of the snow removal vehicle, and other factors relating to the operation of the snow removal vehicle. In one embodiment, the transmission is configured to provide a transmission state to a processing circuit (e.g., as a reverse signal along a hardwired connection to an input of steering control system 300, with a J1939 databus connection, etc.). In one embodiment, the transmission state relates to at least one of a selected transmission gear and an obtained transmission gear. According to another embodiment, steering control system 300 receives various sensor inputs relating to the direction of travel of a vehicle (e.g., a tractor, a trailer, etc.). In one embodiment, the system includes a sensor (e.g., an anti-lock brake sensor, etc.) that provides the sensor inputs to steering control system 300. In other embodiments, steering control system 300 receives various other signals relating to the direction of travel of the vehicle (e.g., signals from a global positioning system, etc.). A control strategy may be generated based on the direction of travel of the vehicle. By way of example, a processing circuit may be configured to control the steering of a pair of tractive elements (e.g., tractive elements coupled to the chassis of a trailer, etc.) according to a control strategy that varies based on the direction of travel of the vehicle. In one embodiment, the control strategy includes centering the pair of tractive elements to facilitate maneuvering the trailer when vehicle is traveling in a reverse direction.

Steering control system 300 includes a processing circuit 304 including a processor 306 and memory 308. Processor 306 may be implemented as a general purpose processor, an application specific integrated circuit (ASIC), one or more field programmable gate arrays (FPGAs), a group of processing components, or other suitable electronic processing components. Memory 308 is one or more devices (e.g., RAM, ROM, flash memory, hard disk storage, etc.) for storing data and/or computer code for completing and/or facilitating the various user or client processes, layers, and modules described in the present disclosure. Memory 308 may be or include volatile memory or non-volatile memory. Memory 308 may include database components, object code components, script components, or any other type of information structure for supporting the various activities and information structures of the present disclosure. Memory 308 is communicably connected to processor 306 and includes computer code or instruction modules for executing one or more processes described herein.

Figure 16:
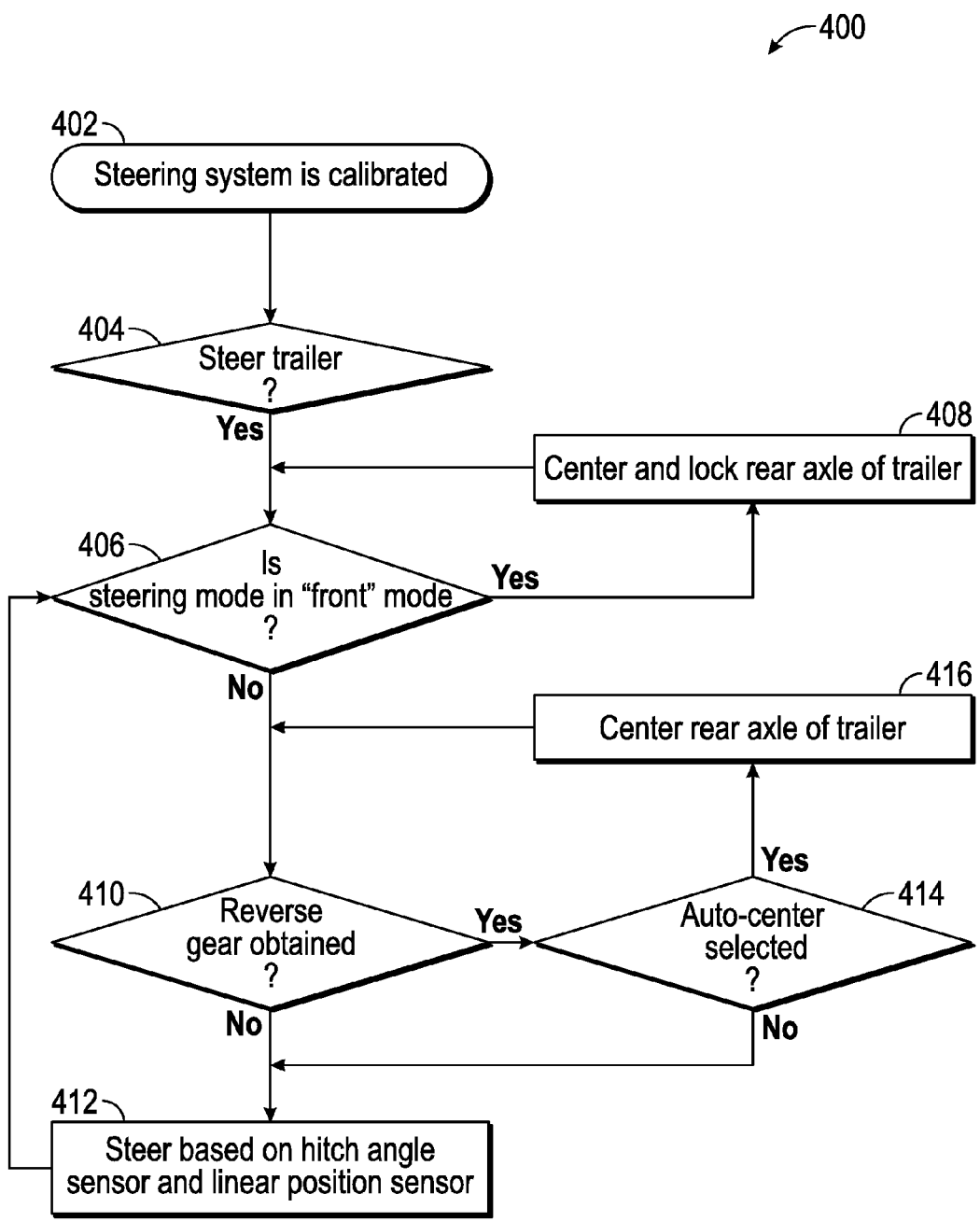
FIG. 16 is a flow chart of a process for steering a trailer, according to an exemplary embodiment.
Figure 17:
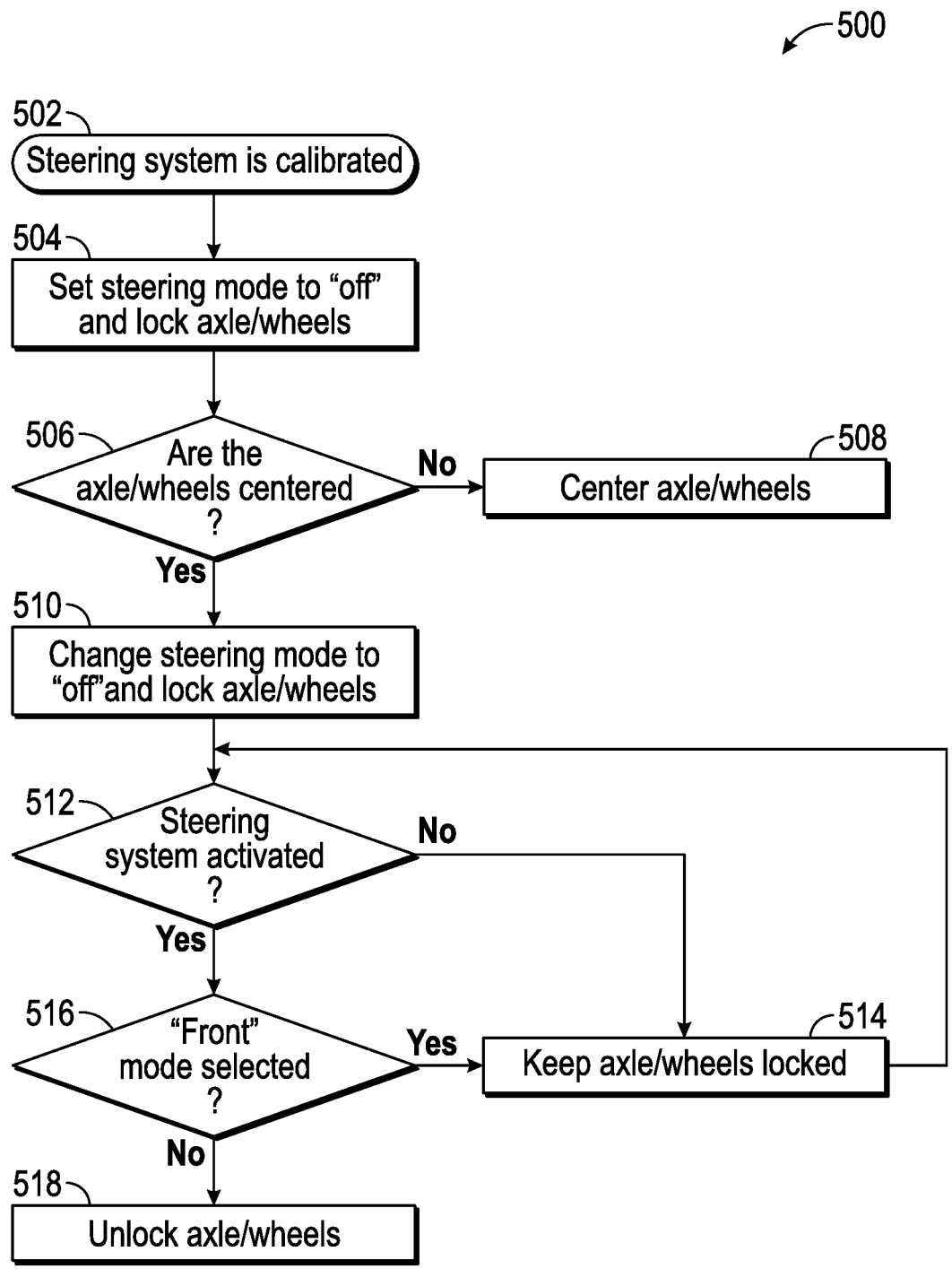
FIG. 17 is a flow chart of a process for locking and unlocking an axle of a trailer, according to an exemplary embodiment.

Memory 308 may include one or more modules configured to handle the activities described in the present disclosure (e.g., the processes of FIGS. 16-17). Memory 308 is shown to include a system information module 310. System information module 310 may receive and store information related to vehicle operation. The information may then be used by other modules for determining various settings. For example, the information may include a sensor input received from sensor 136. The information may further include a sensor input received from hitch angle sensor 150. Such information may be used to determine a target position of a steering cylinder, the wheels of a trailer, or the entire trailer. The information may further include a transmission gear 342 (e.g., reverse gear, first gear, second gear, etc.) of the vehicle as received from a vehicle subsystem 340. Transmission gear 342 is an "obtained" transmission gear, according to one embodiment. Such information may be used to determine if the trailer needs to be steered and in which direction. The information may further include a current vehicle speed 344 as received from a vehicle subsystem 340. The current vehicle speed may be used to determine if the trailer can be steered safely. The information may further include a current alignment of the tractor of the snow removal vehicle. The current alignment of the tractor may be used to align the trailer when the snow removal vehicle is in a forward gear (e.g., such that the trailer appropriately tracks the vehicle). System information module 310 may further store historical information, trailer configuration information, or any other information that may be used by steering control system 300 to determine a control strategy to steer the trailer.

Memory 308 further includes a trailer position module 312. Trailer position module 312 may determine at least one of a current position of a steering cylinder, a current position of the wheels of a trailer, and a current position of the trailer based on a sensor input from sensor 136, a sensor input from hitch angle sensor 150, and other information. Sensor 136 may be embedded into steering cylinder 132 as described above and may provide sensor signals relating to a position of steering cylinder 132. Trailer position module 312 may use the position of steering cylinder 132 relative to the other parts of the trailer to evaluate the current position of trailer 104 itself. In other embodiments, trailer position module 312 determines the current position of the trailer based on sensor input from only hitch angle sensor 150.

Memory 308 further includes a target position module 314. Target position module 314 may determine at least one of a target position of a steering cylinder, a target position of the wheels of a trailer, and a target position of the trailer based on a sensor input from sensor 136, a sensor input from hitch angle sensor 150, and other information. In one embodiment, the target position is calculated using information regarding the physical characteristics of the trailer. In another embodiment, an operator may manually enter an override parameter (e.g., a steering angle, etc.) that is added to or subtracted from the calculated target position to produce a modified target position. The target position may relate to a selected gear for the tractor of the snow removal vehicle. For example, if the snow removal vehicle is in a forward gear, the target position may be a position that varies based on the position of at least the position of a steering cylinder, the hitch angle, and the position of the wheels of the tractor. By way of another example, if the snow removal vehicle is in a reverse gear, the target position may be a position that centers the wheels of the trailer. Hitch angle sensor 150 may be directly coupled to the hitch of the trailer, according to one embodiment, and measure the angle of the hitch relative to the tractor or trailer. The hitch angle indicates a difference in how tractor 102 and trailer 104 are aligned. The hitch angle may be used by target position module 314 to steer the wheels of the trailer so that the hitch angle between the tractor and trailer is reduced or approaches a target value.

Memory 308 further includes a control strategy module 316. Control strategy module 316 is configured to use the current position of the steering cylinder and the target position of the steering cylinder to determine a control strategy for the trailer. The control strategy may relate to a position of one or more actuators for controlling the position of the wheels of the trailer. The control strategy may indicate a level of actuation of, for example, steering cylinder 132 and locking cylinder 144. The control strategy may be provided to I/O module 302 (shown in FIG. 14) via an I/O interface 326. The control strategy output may be a variable output for engaging the actuators (e.g., the variable output may be related to a variable voltage used to control an electrically-actuated solenoid valve).

In one embodiment, the variable output is adjusted based on vehicle speed. For example, if a snow removal vehicle is traveling at a speed greater than a threshold speed (e.g., 20 miles per hour), the variable output may be adjusted such that the rate of steering the axle and wheels of the trailer is reduced to avoid instability. As another example, if the snow removal vehicle is traveling at a lower threshold speed while turning, the variable output may be adjusted to reduce the rate of steering.

Control strategy module 316 may receive a current steering mode of the snow removal vehicle (e.g., from steering mode module 318) that indicates a desired operation of the vehicle, which may be used to determine the control strategy. Control strategy module 316 may receive the current transmission gear of the vehicle and determine the control strategy. If the vehicle is in a reverse gear, control strategy module 316 may set a target position (e.g., a target position for steering cylinder 132) that centers the wheels. If the vehicle is in a forward gear, control strategy module 316 may set a target position that steers the trailer according to a coordinated steering strategy. The actual transmission gear may be provided by the transmission. In other embodiments, the actual transmission gear is otherwise obtained. Utilizing the actual transmission gear reduces the risk of entering an inappropriate control strategy due to inadvertent selection of a transmission gear by an operator. In still other embodiments, control strategy module 316 utilizes another characteristic of the vehicle to determine the control strategy (e.g., a selected transmission gear, a rotation direction of the wheels of the tractor or trailer, etc.).

In one embodiment, control strategy module 316 may be configured to provide a control strategy that locks the axle and wheels of the trailer in place once the wheels have been steered into a proper position (e.g., a straight-ahead orientation). Control strategy module 316 may be configured to determine a position of locking cylinder 144 of locking mechanism 140, for example, and engage locking mechanism 140 to secure the wheels (e.g., in a straight-ahead orientation) with a locking pin.

Memory 308 further includes steering mode module 318. Steering mode module 318 may determine a steering mode that indicates one or more settings to be used by control strategy module 316 for steering the trailer. The steering mode may indicate how (or if) the trailer should be steered. For example, the steering system of the snow removal vehicle may be turned "off," where the wheels of the trailer are not steered to match the path of the vehicle (e.g., the wheels are centered and locked). By way of another example, the steering system of the snow removal vehicle may be turned "on" and the steering system may be in one of a "front mode" and a "coordinated mode." In some embodiments, turning on or off the entire trailer steering system may require supervisor approval (e.g., with a password, etc.), whereas a driver may be allowed to toggle between front mode and coordinated mode during ordinary operation of the vehicle. With the steering system turned "on" and with the trailer steering system in the front mode, the trailer wheels are not steered. With the steering system turned on and with the trailer steering system in the coordinated mode, the trailer wheels may be unlocked and steered such that the trailer path matches the path of the tractor. Regardless of the selected mode, the trailer wheels may be centered once the tractor is in reverse (e.g., once a reverse transmission gear is obtained, once the tractor or trailer begins to move backward, etc.). Such a control scheme facilitates backing the trailer as a driver may rely upon prior experience backing up traditional, fixed-axle trailers.

In one embodiment, the steering mode may be determined by steering mode module 318 based on input from vehicle subsystems 340, such as transmission gear 342. For example, the steering mode may be automatically set to "front" when the snow removal vehicle is in a reverse transmission gear 342 and "coordinated" when the snow removal vehicle is in a forward transmission gear 342. An operator (e.g., the driver) of the snow removal vehicle may override the steering mode at any time using an interface (e.g., the interface of FIGS. 18-20). In another embodiment, the steering mode may not be automatically determined, and an operator may manually set the steering mode at his or her discretion.

In one embodiment, steering mode module 318 may store configuration information for one or more operators (e.g., a driver, an administrator or manager, etc.) of the snow removal vehicle. Steering mode module 318 may then set a steering mode based on the configuration information in addition to vehicle subsystem 340 information. By way of example, the system may require that a manager set a desired steering mode for the snow removal vehicle while the truck is in operation, instead of allowing the driver of the truck to override the steering mode. By way of another example, a driver may have desired steering mode settings that override default settings. In one embodiment, an operator may provide a password or other identification to steering control system 300 (e.g., a user ID, a timekeeper code, etc.). Steering mode module 318 or another module of steering control system 300 may verify the identification prior to changing a steering mode of the snow removal vehicle. Such identification and authentication reduces the risk that a less experienced driver may improperly operate the vehicle.

Memory 308 further includes calibration module 320. Calibration module 320 may be configured to calibrate at least one of sensor 136 and hitch angle sensor 150. In other embodiments, calibration module 320 receives a user input to calibrate at least one of sensor 136 and hitch angle sensor 150. Calibration module 320 may prompt an operator of the snow removal vehicle to drive forward or in a predetermined direction in order to calibrate the sensors. For example, calibration module 320 may prompt the operator to pull ahead and provide an indication to calibration module 320 (e.g., that the vehicle has been pulled ahead) before calibrating hitch angle sensor 150.

Figure 18:
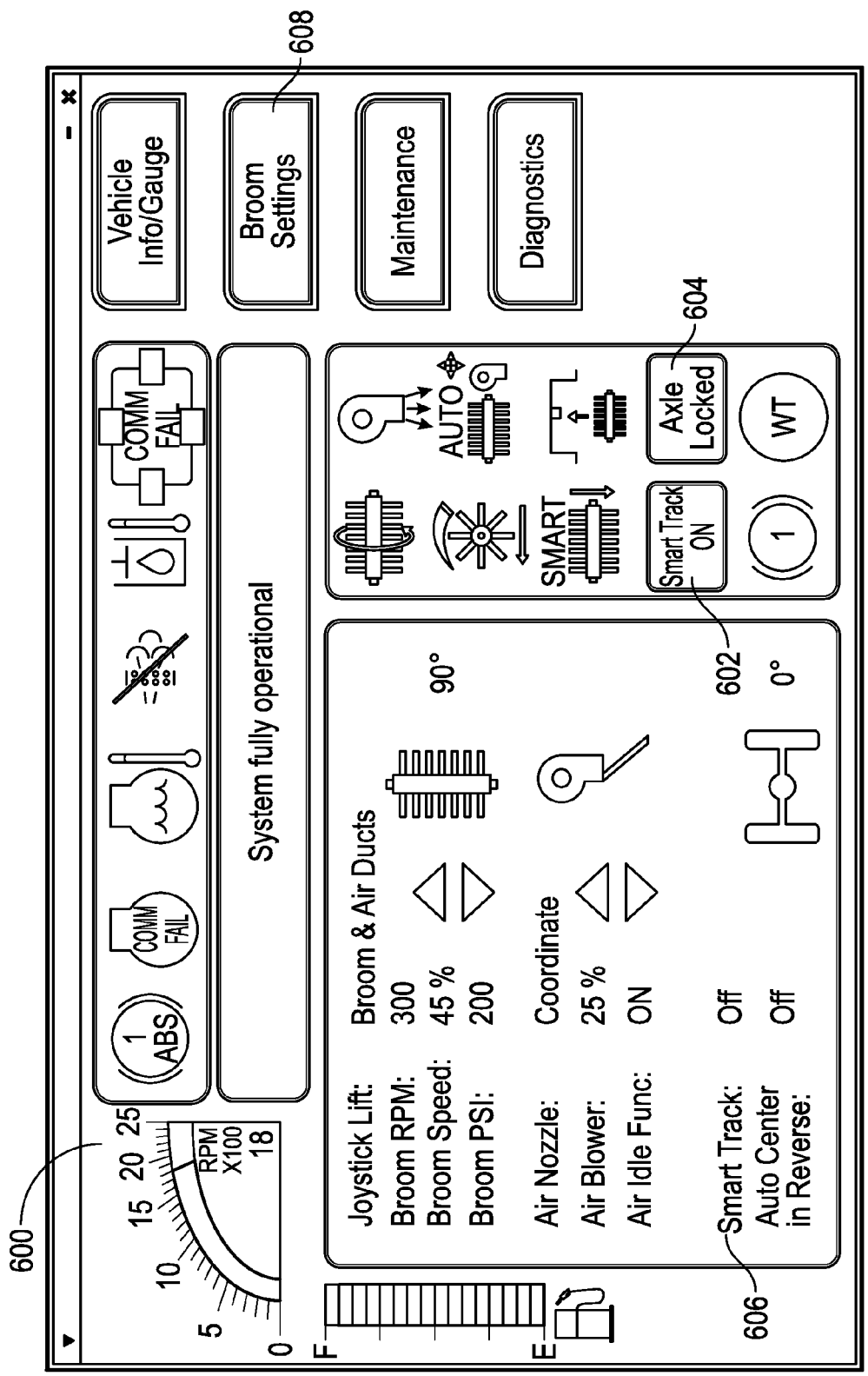
FIGS. 18-20 are user interfaces for interacting with a steering control system, according to an exemplary embodiment.
Figure 19:
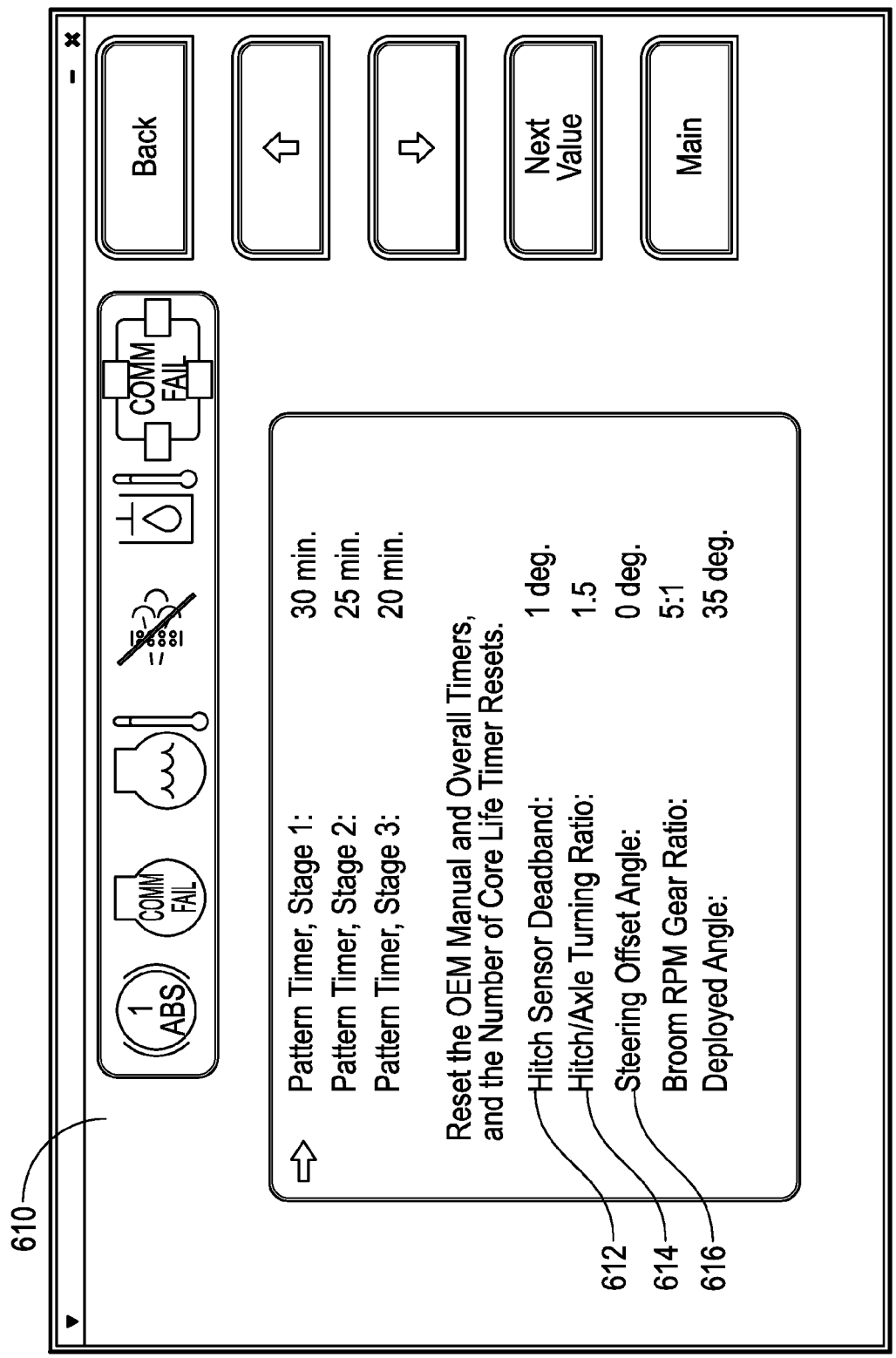
Figure 20:
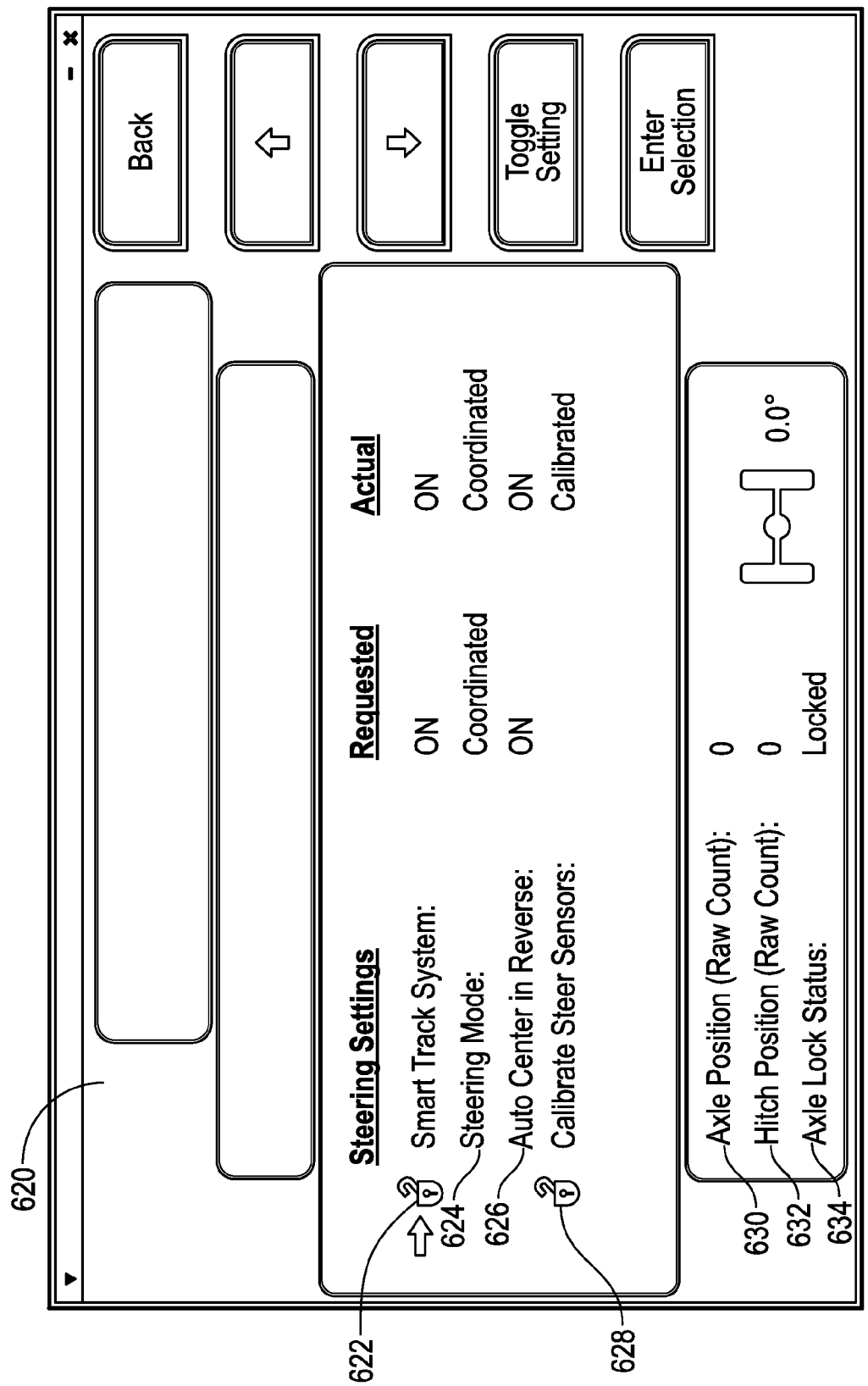

Memory 308 further includes a graphical user interface (GUI) module 322. GUI module 322 is configured to generate a GUI for an operator of the snow removal vehicle, such as the user interfaces shown in FIGS. 18-20, and to receive and interpret the user input from the user interface. For example, GUI module 322 may receive a user input relating to a change in the steering mode, a change between automatic and manual steering of the trailer, or otherwise. Steering control system 300 is further shown to include UI elements 330 and a display module 332 configured to provide the display to the user. UI elements 330 may allow the user to provide a user input via a touchscreen display, via a keyboard, a mouse or other pointer, and/or via one or more buttons, knobs, or switches located on the user interface or elsewhere in the snow removal truck, or otherwise. Display module 332 may be configured to provide a display as generally shown in FIGS. 18-20.

Steering control system 300 further includes a sensor interface 324 configured to receive data from sensor 136 and hitch angle sensor 150. Steering control system 300 also includes an interface 328 configured to receive data from one or more vehicle subsystems 340 as described above. Still other interfaces may be included to facilitate the transmission of signals between the various components of steering control system 300.

Referring next to FIG. 16, a flow chart of a process 400 for controlling the steering of the wheels of a trailer is shown, according to an exemplary embodiment. Process 400 may be executed by, for example, control strategy module 316 or another module configured to steer the wheels of a trailer. It should be understood that process 400 may include various sub-steps. In other embodiments, process 400 includes more or fewer steps than those shown in FIG. 16.

Process 400 includes calibration of the steering system (step 402). For example, step 402 may include calibrating at least one of a position sensor (e.g., a linear position sensor coupled to a steering cylinder) and a hitch angle sensor of the trailer. Step 402 may be executed prior to operation of the snow removal vehicle (e.g., prior to plowing snow). Process 400 further includes a steering step (step 404). At step 404, the trailer steering may be turned on or off. In other embodiments, the trailer steering may be turned on or off prior to step 404, and step 404 may involve verification that the trailer steering is turned on.

Process 400 further includes determining if the steering mode is currently in a "front" mode (step 406). The front mode may correspond to a mode where the wheels and axle of the trailer are not steered to match the path of the tractor (e.g., the wheels and axle may be centered and locked). If the steering mode is the front mode, process 400 includes centering and locking the rear axle of the trailer (step 408).

If the steering mode is not in front mode, process 400 includes determining if a tractor reverse gear is obtained (step 410). In other words, at step 410, process 400 may check if the snow removal vehicle has been switched into a reverse gear. In one embodiment, the transmission gear of the snow removal vehicle may be obtained based on a current status of the transmission gear. In another embodiment, the gear selected by an operator may be used at step 410. The use of the current status of the transmission gear instead of the selected gear may reduce the risk of using the reverse gear in scenarios where the operator has inadvertently selected the reverse gear.

If the tractor is not in a reverse gear, then the current steering mode of the snow removal vehicle may continue. The trailer may be steered based on sensor input from a hitch angle sensor and other sensor input (step 412). In one embodiment, step 412 includes evaluating a feature (e.g., a position, a configuration, etc.) of a locking cylinder. Step 412 may include actuating a locking cylinder to unlock the wheels. By way of example, such actuation may include sending a command signal to open a pneumatic valve or engage a pump such that pressurized fluid overcomes a biasing spring and disengages a locking pin from a locking plate. If the tractor is in a reverse gear, process 400 includes determining if an auto-center mode is selected (step 414). An operator may choose to select or de-select an auto-center mode. The auto-center mode may automatically center the wheels of the trailer whenever the snow removal vehicle is in a reverse gear, without input. If the auto-center mode is selected by the operator, the axle and wheels of the trailer are steered into a centered position (step 416) and process 400 may continue to monitor the current transmission gear. If the auto-center mode is not selected by the operator, the snow removal vehicle may continue to be steered based on the current steering mode at step 412. In one embodiment, step 416 includes locking the wheels by sending a command signal to open a relief valve (e.g., a quick-release valve, etc.) such that a biasing spring engages a locking pin with a locking plate.

Referring next to FIG. 17, a flow chart of a process 500 for locking and unlocking the axle and wheels of a trailer for a vehicle (e.g., a snow removal vehicle) is shown, according to an exemplary embodiment. Process 500 may be executed by, for example, control strategy module 316 or another module configured to steer the wheels of a trailer. It should be understood that process 500 may include various sub-steps. In other embodiments, process 500 includes more or fewer steps than those shown in FIG. 17.

Process 500 includes a calibration of the steering system (step 502). For example, step 502 may include calibrating at least one of a position sensor (e.g., a linear position sensor coupled to a steering cylinder) and a hitch angle sensor of the trailer. Step 502 may be executed prior to operation of the snow removal vehicle (e.g., prior to plowing snow). Process 500 further includes a selection of an "off" steering mode (step 504). At step 504, the steering mode of the trailer is set to off and interlocks are met (e.g., the axle and wheels are in proper position).

Process 500 further includes determining if the axle is centered (step 506). Step 506 may include the evaluation of sensor signals from a sensor (e.g., linear position sensor) associated with a steering cylinder or the position of the wheels. By way of example, step 506 may include the evaluation of sensor signals from a linear position sensor that is integrated as part of a steering cylinder. If the wheels are not centered, the wheels may be centered (step 508) by sending a control signal to an actuator. Process 500 further includes changing the steering mode of the snow removal vehicle to "off" and locking the axle and wheels (step 510), completing the axle locking process.

Process 500 later includes determining if an operator has activated the steering system (step 512). The activation of the steering system may be made by an operator via a user interface as generally described in FIGS. 18-20. The steering system may be initiated by an operator preparing to operate a snow removal vehicle, for example. If the operator has not activated the steering system, the axle and wheels may remain locked (step 514). If the operator has activated the steering system, process 500 includes determining if the selected steering mode is the "front" mode (step 516). If the front mode is selected, the axle and wheels remain locked (step 514), as the steering mode indicates that the trailer should be steered based on the current position of the axle and wheels. If a different steering mode is selected by the operator or by steering control system 300, the axle and wheels are unlocked (step 518).

Referring generally to FIGS. 18-20, various user interfaces that an operator may use to interact with the steering control system of the present disclosure are shown, according to exemplary embodiments. Referring to FIG. 18, a user interface 600 is illustrated. User interface 600 may be located on, for example, the dashboard of a vehicle (e.g., snow removal vehicle 100), within reach of the driver, operator, or other occupant of the vehicle. In other embodiments, user interface 600 may be located in another area of the vehicle, or additional user interfaces may be provided. For example, one or more buttons, switches, or levers may be located on an arm rest or other vehicle feature within reach of the operator. The operator may control some or all aspects of the steering control process via the user interface.

User interface 600 includes general vehicle information, such as a vehicle speed, fuel level, system diagnostics, etc. User interface 600 may further include one or more warning lights related to general vehicle operation. User interface 600 may further include snow blower or snow plow statuses. For example, if the snow blower is currently in use, one or more indicators related to snow plow or snow blower functionality may be provided. Similarly, user interface 600 may further include trailer broom properties (e.g., broom wear, broom speed, broom RPM, etc.). User interface 600 may indicate if the trailer steering system is in a coordinated mode via indication 602 or if the axle of the trailer is locked in position via indication 604. User interface 600 may include an indication 606 for an on/off status of the trailer steering system. As shown in FIG. 18, user interface 600 indicates that the trailer steering system is off.

User interface 600 may include various options that an operator may select to bring up another screen. For example, the user may view vehicle gauge information, broom settings, maintenance information, or diagnostic information of the vehicle. In one embodiment, the operator may select the "broom settings" option 608 to bring up user interface 610 shown in FIG. 19. User interface 610 may display various broom settings that the operator may view or adjust. Via user interface 610, the operator may adjust a broom pattern (e.g., rotation and position of the broom).

Via user interface 610, the operator may also adjust one or more settings related to the steering of the trailer, as the broom is coupled to the trailer and trailer adjustments may impact the performance of the broom. For example, user interface 610 indicates a hitch sensor deadband 612 that indicates the deadband of the hitch angle sensor, a hitch/axle turning ratio 614 that indicates the ratio between the steering wheel of the snow removal vehicle and the wheels of the trailer, and a steering offset angle 616 as a manual override to the target position calculated by the steering control system (e.g., an angular value relating to the steering angle of the trailer wheels, an angular value relating to the angle of the trailer relative to the tractor, etc.). In one embodiment, user interface 610 facilitates user manipulation of at least one of hitch sensor deadband 612, hitch/axle turning ratio 614, and steering offset angle 616.

Referring now to FIG. 20, upon a user selection to change one or more settings related to the steering control system of the vehicle, user interface 620 may be presented to the operator. User interface 620 may include a plurality of options related to the steering control system. For example, an operator may choose to activate or deactivate a "smart track system" at option 622 (i.e. the steering control system may be turned on or off). The operator may further choose the type of steering mode at option 624. For example, the operator may choose to put the trailer in a coordinated steering mode such that the wheels of the trailer are steered. By way of another example, the operator may choose to put the trailer in a front steering mode, where the wheels of the trailer are not steered. The operator may further choose whether or not to have the wheels of the trailer auto-centered when the snow removal vehicle is in a reverse transmission gear at option 626. The operator may further choose to calibrate the sensors (e.g., hitch angle sensor and linear position sensor) at option 628. In still other embodiments, user interface 620 may allow an operator to manually set the steering angle for the trailer wheels, set the hitch angle, or set still another feature of the steering control system (i.e. the trailer steering system may be operated in a manual mode).

User interface 620 may additionally display axle and wheel properties. For example, an axle position 630 and hitch position 632 is displayed that illustrates the current position of the axle and hitch (e.g., as a raw count, as a measured or computed angle, etc.). An axle lock status 634 may also be displayed that indicates whether the axle and wheels of the trailer are locked or free to turn. User interface 620 may further illustrate the requested and actual statuses for the steering control system, thereby reducing the risk that an operator may assume the system has responded before the requested action has occurred.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data, which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A trailer, comprising:
a chassis having a hitch;
an axle having a pair of tractive elements rotatably coupled to the chassis;
an actuator coupled to the chassis and positioned to steer the pair of tractive elements; and
a processing circuit having an input for receiving a transmission gear of a tractor vehicle and a variable output for engaging the actuator, wherein the processing circuit is configured to control the steering of the pair of tractive elements according to a control strategy that varies based on the transmission gear of the tractor vehicle.

2. The trailer of claim 1, wherein the control strategy includes centering the pair of tractive elements to facilitate maneuvering the trailer when the transmission gear is a reverse gear.

3. The trailer of claim 2, wherein the control strategy includes controllably steering the pair of tractive elements such that the trailer follows the tractor vehicle when the transmission gear is a forward gear.

4. The trailer of claim 3, further comprising a position sensor coupled to the actuator, wherein the processing circuit is configured to receive sensor input from the position sensor, and wherein the processing circuit is configured to use the sensor input from the position sensor to determine a current position of the actuator.

5. The trailer of claim 4, further comprising a hitch angle sensor coupled to the hitch, wherein the processing circuit is configured to receive sensor input from the hitch angle sensor, and wherein the processing circuit is configured to use the sensor input from the hitch angle sensor to determine a target position for the actuator.

6. The trailer of claim 5, wherein the processing circuit uses the target position and the current position to adjust the variable output.

7. The trailer of claim 6, wherein the actuator includes a hydraulic cylinder and the position sensor includes a linear position sensor.

8. The trailer of claim 7, wherein the variable output is an output for an electronically adjustable valve for affecting pressure in the hydraulic cylinder.

9. The trailer of claim 4, further comprising a locking mechanism coupled to the chassis, wherein the processing circuit includes an output for engaging the locking mechanism, and wherein the processing circuit is configured to selectively secure the pair of tractive elements by engaging the locking mechanism.

10. The trailer of claim 9, wherein the processing circuit is configured to receive user input from a user input device, the user input including a command to fix the axle, wherein the processing circuit is configured to center the pair of tractive elements and engage the locking mechanism upon receiving the user input.

11. The trailer of claim 9, wherein the processing circuit is configured to engage the locking mechanism after centering the pair of tractive elements.

12. The trailer of claim 11, wherein the locking mechanism includes a locking pin moveably coupled to the chassis with a locking actuator.

13. The trailer of claim 12, wherein the locking actuator includes an air-released spring.

14. A vehicle, comprising:
a tractor vehicle having a transmission configured to provide a transmission state relating to at least one of a selected transmission gear and an obtained transmission gear;
a trailer, comprising:
a chassis;
an axle having a pair of tractive elements rotatably coupled to the chassis; and
an actuator coupled to the chassis and positioned to steer the pair of tractive elements; and
a processing circuit having an input for receiving the transmission state and a variable output for engaging the actuator, wherein the processing circuit is configured to control the steering of the pair of tractive elements according to a control strategy that varies based on the transmission state.

15. The vehicle of claim 14, wherein the control strategy includes centering the pair of tractive elements to facilitate maneuvering the trailer when the obtained transmission gear is a reverse gear.

16. The vehicle of claim 15, wherein the control strategy includes controllably steering the pair of tractive elements such that the trailer follows the tractor vehicle when the at least one of the selected transmission gear and the obtained transmission gear is a forward gear.

17. The vehicle of claim 16, further comprising a locking mechanism coupled to the chassis, wherein the processing circuit includes an output for engaging the locking mechanism, and wherein the processing circuit is configured to selectively secure the pair of tractive elements after centering the pair of tractive elements by engaging the locking mechanism.

18. A steering control method for a trailer including a chassis, an axle having a pair of tractive elements rotatably coupled to the chassis, and an actuator coupled to the chassis and positioned to steer the pair of tractive elements, the method comprising:

identifying a transmission gear of a tractor vehicle with a processing circuit;

controllably steering the pair of tractive elements such that the trailer follows the tractor vehicle when the transmission gear is a forward gear; and centering the pair of tractive elements to facilitate maneuvering the trailer when the transmission gear is a reverse gear.

19. The method of claim 18, further comprising determining a target position for the actuator with the processing circuit by evaluating sensor input from a position sensor and sensor input from a hitch angle sensor.

20. The method of claim 19, further comprising securing the pair of tractive elements with a locking mechanism.

* * * * *